(12) United States Patent
Johnson et al.

(10) Patent No.: US 10,608,503 B2
(45) Date of Patent: Mar. 31, 2020

(54) GENERATOR SET INTEGRATED GEARBOX

(71) Applicant: Cummins Power Generation Limited, Kent (GB)

(72) Inventors: Paul D. Johnson, Minneapolis, MN (US); Kent A. Lobsiger, Nashville, IN (US); Sze Kwan Cheah, St. Paul, MN (US); Tejaskumar Rajendrakumar Amin, Ramsgate (GB); Peter Andrew Goleczka, Minnetonka, MN (US)

(73) Assignee: Cummins Power Generation Limited, Kent (GB)

( * ) Notice: Subject to any disclaimer, the term of this patent is extended or adjusted under 35 U.S.C. 154(b) by 0 days.

(21) Appl. No.: 16/396,319

(22) Filed: Apr. 26, 2019

(65) Prior Publication Data

US 2019/0252946 A1    Aug. 15, 2019

Related U.S. Application Data

(63) Continuation of application No. 15/355,793, filed on Nov. 18, 2016, now Pat. No. 10,305,350.

(51) Int. Cl.
*F02B 63/04* (2006.01)
*H02K 7/18* (2006.01)
(Continued)

(52) U.S. Cl.
CPC .......... *H02K 7/1815* (2013.01); *F02B 63/04* (2013.01); *F02B 63/044* (2013.01); *F16H 1/28* (2013.01);
(Continued)

(58) Field of Classification Search
CPC .......... F02B 63/04; F02B 63/044; F16H 1/28
(Continued)

(56) References Cited

U.S. PATENT DOCUMENTS 1,362,770 A    12/1920    Bijur
5,085,396 A    2/1992    Mansson
(Continued)

FOREIGN PATENT DOCUMENTS

DE    32 33 567    3/1984
DE    33 34 429    4/1985
(Continued)

OTHER PUBLICATIONS

International Preliminary Report on Patentability Received for Application No. PCT/IB2017/057236, May 31, 2019, 8 pages.

*Primary Examiner* — Tulsidas C Patel
*Assistant Examiner* — Thomas K Quigley
(74) *Attorney, Agent, or Firm* — Foley & Lardner LLP

(57) ABSTRACT

A generator set comprises an engine including a crankshaft rotatable in a first direction about a longitudinal axis of the generator set, and a generator including a generator shaft. A gearbox is positioned between the engine and the generator, all mounted on a chassis. The gearbox couples the crankshaft to the generator shaft. The gearbox includes a gearbox housing having a first end and a second end. The first end is coupled to an engine first end and the second end is coupled to a generator first end. The gearbox also includes a gear set including a plurality of gears, a first gear shaft coupled to a crank shaft first end, and a second gear shaft coupled to a generator shaft first end. The crankshaft and at least a portion of the plurality of gears, and the generator shaft are axially aligned along the longitudinal axis of the generator set.

20 Claims, 19 Drawing Sheets

(51) Int. Cl.
*F16H 1/28* (2006.01)
*F16H 57/025* (2012.01)
*H02K 7/116* (2006.01)

(52) U.S. Cl.
CPC ........... *F16H 57/025* (2013.01); *H02K 7/116* (2013.01); *F02B 2063/045* (2013.01)

(58) Field of Classification Search
USPC ........................................................ 248/678
See application file for complete search history.

(56) References Cited

U.S. PATENT DOCUMENTS

| | | | |
|---|---|---|---|
| 6,334,746 | B1 | 1/2002 | Nguyen et al. |
| 6,869,367 | B2 | 3/2005 | Herdin et al. |
| 6,897,578 | B1 | 5/2005 | Olsen et al. |
| 7,028,970 | B1 | 4/2006 | Wiseman |
| 7,969,030 | B2 | 6/2011 | Woods et al. |
| 7,976,266 | B2 | 7/2011 | Brown et al. |
| 8,590,151 | B2 | 11/2013 | Brown et al. |
| 8,857,192 | B2 | 10/2014 | Huang et al. |
| 8,907,517 | B2 | 12/2014 | Mongeau et al. |
| 9,551,451 | B2 | 1/2017 | Wilson et al. |
| 2003/0057704 | A1 | 3/2003 | Baten et al. |
| 2005/0000224 | A1 | 1/2005 | Jonsson |
| 2010/0294585 | A1* | 11/2010 | Wolff ........................ H02K 5/24 180/298 |
| 2013/0106113 | A1 | 5/2013 | Wang et al. |
| 2013/0106114 | A1 | 5/2013 | Wang et al. |
| 2013/0187390 | A1 | 7/2013 | Smook et al. |

FOREIGN PATENT DOCUMENTS

| | | |
|---|---|---|
| DE | 29513958 | 2/1997 |
| EP | 1 119 092 | 7/2001 |
| WO | WO-2016/112094 A1 | 7/2016 |

* cited by examiner

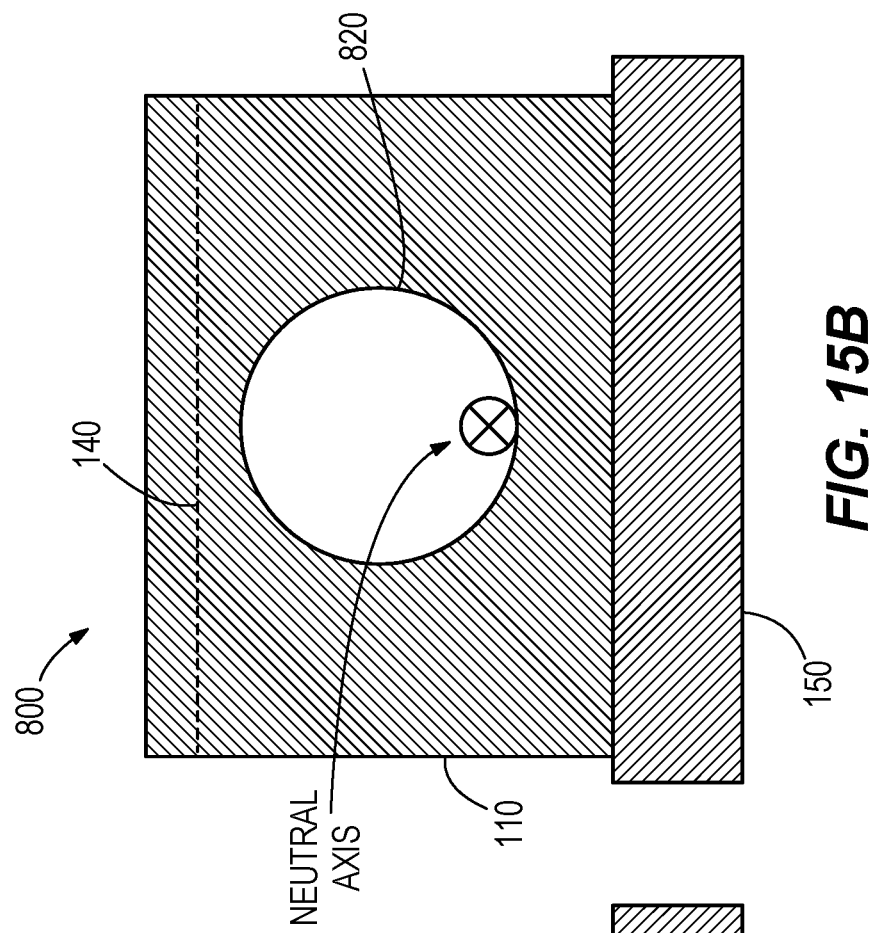
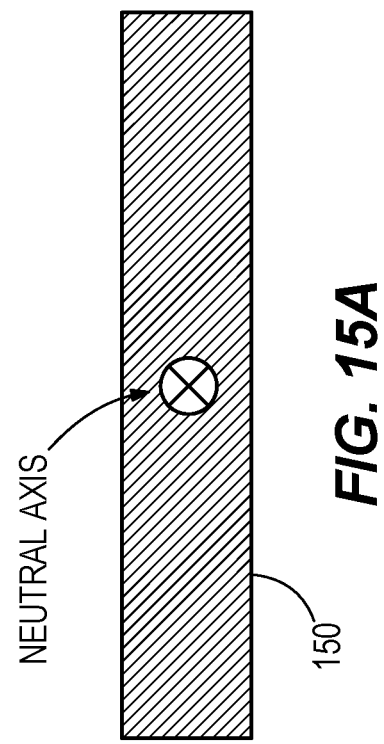
FIG. 15B
FIG. 15A

GENERATOR SET INTEGRATED GEARBOX

CROSS-REFERENCE TO RELATED APPLICATIONS

This application is a continuation of U.S. application Ser. No. 15/355,793, filed Nov. 18, 2019, the content of which is hereby incorporated by reference in its entirety.

TECHNICAL FIELD

The present disclosure relates generally to generators sets (gensets) for energy generation.

BACKGROUND

Gensets are used for various power generation applications which can include industrial or consumer power generation. Gensets generally include an engine, for example an internal combustion (IC) engine running on gasoline, diesel, natural gas, dual-fuel, biodiesel or any other fuel, and a generator for converting the mechanical work performed by the engine into electrical energy such as an alternator. The engine is coupled to the generator using a gearbox which can include gears to adjust the speed, power and/or torque produced by the engine and transferred to the generator.

SUMMARY

In some embodiments, a generator set includes an engine including a crankshaft rotatable in a first direction about a longitudinal axis of the genset, and a generator including a generator shaft. A gearbox is positioned between the engine and the generator. The gearbox couples the crankshaft to the generator shaft. The gearbox includes a gearbox housing having a first end and a second end. The first end is structured to couple to an engine first end of the engine and the second end is structured to couple to a generator first end of the generator. A first flange rigidly couples the first end of the gearbox housing to the engine first end, and a second flange rigidly couples the second end of the gearbox housing to the generator first end. The gearbox also includes a gear set including a plurality of gears, a first gear shaft coupled to a crank shaft first end, and a second gear shaft coupled to a generator shaft first end. The generator set also includes a skid frame. Each of the engine, the gearbox and the generator are positioned on and coupled to the skid frame. The crankshaft and at least a portion of the plurality of gears, and the generator shaft are axially aligned along the longitudinal axis of the generator set. Furthermore, the gearbox interfaces with the engine and the generator to form a rigid torque tube structure.

In some embodiments, a gearbox for coupling a crankshaft of an engine to a generator shaft of a generator includes a gearbox housing having a first end and a second end. The first end is structured to couple to an engine first end and the second end is structured to couple to a generator first end. The gearbox housing is structured to be positioned on and rigidly coupled to a skid frame. The gearbox also includes a gear set including a plurality of gears, a first gear shaft and a second gear shaft. The first gear shaft is structured to couple to a crank shaft first end. Furthermore, a second gear shaft is structured to couple to a generator shaft first end such that the crankshaft, at least a portion of the plurality of gears, and the generator shaft are axially aligned when the gearbox is coupled to the engine and the generator.

In some embodiments, a method of coupling a crankshaft of an engine to a generator shaft of a generator includes providing a gear box. The gearbox includes a gearbox housing having a first end and a second end. The gearbox also includes a gear set including a plurality of gears, a first gear shaft and a second gear shaft. The first end of the gearbox housing is coupled to an engine first end. The first gear shaft is coupled to a crankshaft first end such that at least a portion of the plurality of gears are axially aligned with the crankshaft. The second end of the gearbox housing is coupled to an engine second end. The second gear shaft is coupled to a generator shaft. Each of the engine, the gearbox and the generator are positioned on and rigidly coupled to a skid frame such that the crankshaft, the generator shaft, and at least a portion of the plurality of gears are axially aligned. Furthermore, the engine, the gearbox and the generator form a rigid torque tube.

In some embodiments, a generator set comprises an engine including a crankshaft rotatable in a first direction about a longitudinal axis of the generator set, and a generator including a generator shaft. A gearbox is positioned between the engine and the generator and couples the crankshaft to the generator shaft. The gear box includes a gearbox housing having a first end and a second end. A first flange rigidly couples the first end of the gearbox housing to the engine first end, and a second flange rigidly couples the second end of the gearbox housing to the generator first end. The gearbox also includes a gear set including a plurality of gears. A first gear shaft is coupled to a crankshaft first end of the crankshaft, and a second gear shaft is coupled to a generator shaft first end of the generator shaft. The generator set also includes a skid frame. Each of the engine and the generator are positioned on and rigidly coupled to the skid frame.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 15A shows a side cross-section of a chassis included in the generator set of FIG. 15 having a neutral axis if the gearbox is not rigidly attached to the engine and generator, and FIG. 15B shows the side cross-section of the chassis and gear box with the engine, the generator mounted thereon with the gear box coupled to the engine and the generator causing a shift in the neutral axis.

Figure 1:
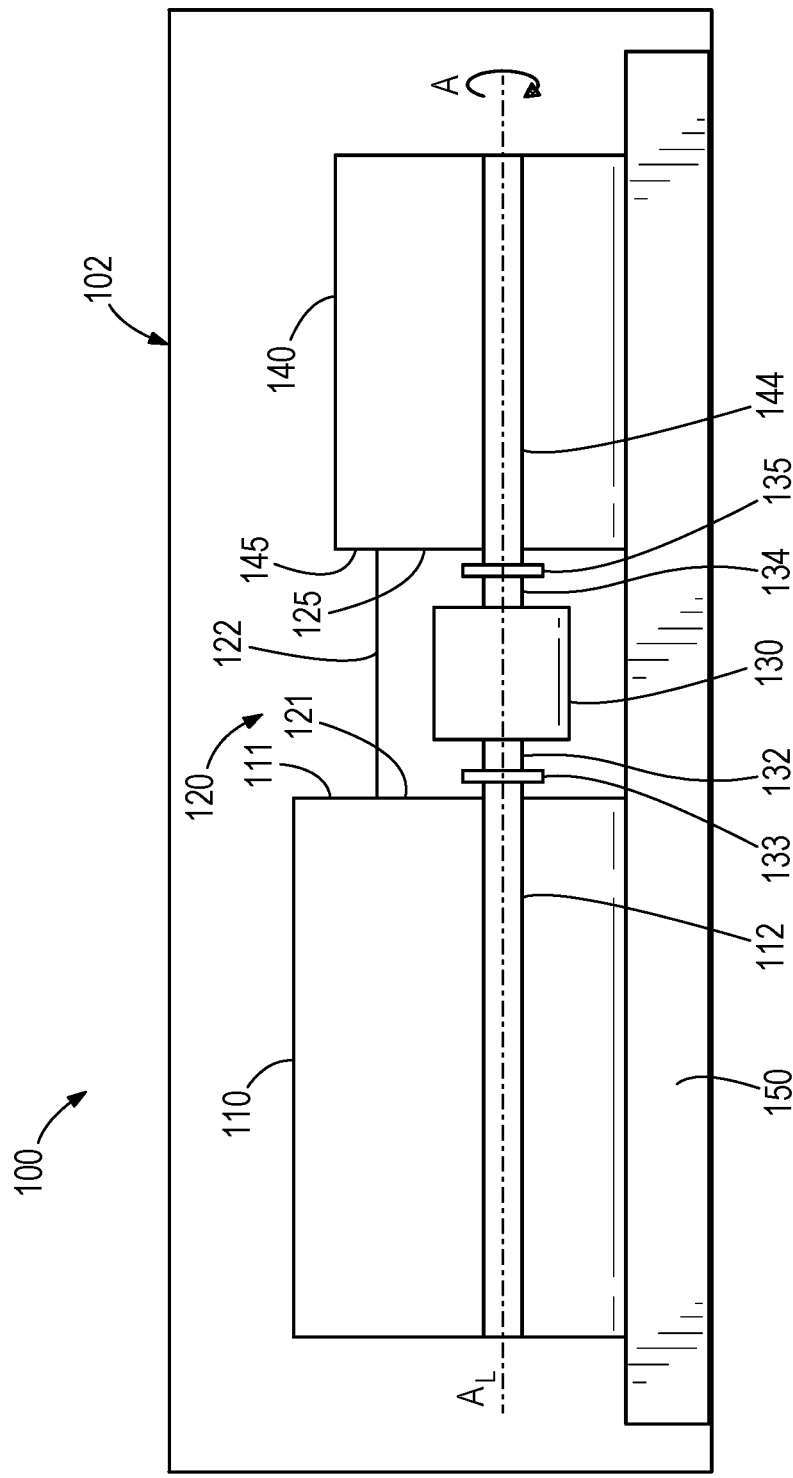
FIG. 1 is a schematic illustration of a generator set including an engine, a generator and a gearbox positioned therebetween.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Generally, gearboxes used for operatively coupling the engine to the generator (e.g., an engine crankshaft to a generator shaft) are freestanding or structurally independent gearboxes which include gears which are operatively coupled to each of the crankshaft and the generator shaft, in particular on high horsepower large displacement gensets (e.g., greater than 500 kW \). The gearbox is generally structured such that an axis of the crankshaft and the generator shaft are offset from each other. Furthermore, the gears are operative to cause the generator shaft to rotate in an opposite direction relative to the crankshaft. In such assemblies, the reaction torque stress of on-going torque output or sudden torque/power output step functions (rising or falling) produced by the crankshaft are generally absorbed by the gearbox and translated to a mount or chassis on which the gearbox is mounted. This focused stress requires enhanced mounting arrangements for the gearbox and an over-engineered skid frame or chassis to take the entire reactive torque stress of the genset to absorb the torque stress the engine is applying to drive the generator as well as the mounting stress from the gearbox on the relatively planar skid frame and avoid frame/mount cracking, particularly with large high horsepower gensets. This raises the weight, cost, and physical dimensions of the chassis. Moreover, the misalignment of the crankshaft and the generator shaft also increase the physical dimensions of the genset.

In some instances, the gearbox included in large gensets, for example gensets having a power rating of greater than 500 kW, are open coupled with the engine and/or generator of the genset (e.g., such that the gearbox is not bolted or otherwise rigidly fixed to the engine and/or generator). A casing of the gearbox is mounted on a chassis or frame on which the engine and/or generator of the genset are positioned and the torque produced by the crankshaft and the gearbox are transferred through a casing of the gearbox to the chassis or frame. This increases the load and mechanical strength requirements of the chassis or frame such that the chassis is often structured to have sufficient mechanical strength and rigidity for supporting the weight of the gearbox as well as the torque produce by the gearbox.

Embodiments described herein relate generally to systems and methods for coupling a crankshaft of an engine with a generator shaft of a generator using a gear box. Particularly, various embodiments described herein relate to a gearbox which includes a housing physically coupled to the engine and the generator and is structured to couple the crankshaft of the engine to the generator shaft of the generator so that the crankshaft, the generator shaft and at least a portion of a plurality of gears in the gear box are axially aligned, which may be considered as a close coupled system.

Embodiments of the genset integrated gearbox described herein may provide several benefits including, for example: (1) structurally integrating the gearbox, engine, generator, and optionally, the skid frame to spread a torque load generated by the crankshaft through a gearbox housing of the gearbox by physically coupling the gearbox housing to the engine and generator, and mounts of the engine and the generator to a chassis or frame on which the engine, the gearbox and the generator are mounted; (2) concentrating structural strength at the interface between the engine and the generator where it is required and reducing the torque stress on the mounts, frame or other portions of the chassis; (3) reducing the overall size of the genset allowing for a more compact system, thereby reducing required installation footprint; (4) by spreading the torque load over the engine, gearbox and generator, allowing reduction of the size and structural requirements of the chassis due to reduced torque load, use of less expensive chassis materials, and lower strength requirements; (5) allowing lowering of the chassis profile, allowing the genset to have lower height, less weight and smaller space requirements, thereby fitting more readily into enclosures and tight customer spaces and reducing handling and shipping costs; (6) increasing resonant frequencies to higher modes which are structurally less problematic by stiffening the genset with an integrated gearbox; (7) allowing rotation of the crankshaft and generator shaft in the same direction, reducing overall stress on the chassis and the interface between the engine and the generator; (8) allowing better access to regions below the gearbox for maintenance operations by reducing the chassis structure; and/or (9) providing auxiliary power gears (also referred to herein as "idler shaft gears") for recovering waste energy (e.g., via exhaust energy recovery turbines or organic Rankine cycle heat recovery) that is rerouted to main gears of the gearbox.

As used herein, the term "torque tube" refers to a rigid overall structure formed via rigid structural coupling or otherwise integration of a gearbox, an engine and a generator included in a genset assembly to each other so that the overall structure reacts to a torque in the same direction.

FIG. 1 shows a schematic illustration of a genset 100 according to an embodiment. The genset 100 includes an engine 110, a gearbox 120, a generator 140 and skid frame or chassis 150. The genset 100 can be used for industrial and/or consumer electrical power generation. The genset 100 may be a back-up power source in the event of a loss of electrical grid power. In one implementation, the genset 100 may be provided to subsidize grid electricity (parallel to the grid) or as the primary power source when grid electricity is not being used or when grid electricity fails. In other implementations, the genset 100 may be provided as a secondary source of power for homes or businesses. In yet another implementation, the genset 100 may be the primary source of power where grid power is not readily available, such as remote locations or construction sites. The genset 100 can also be used as a primary power source for marine vessels, railway engines, construction equipment, or any other application where mechanical and/or electrical power is desired.

In some embodiments, the engine 110, the gearbox 120 and the generator 140, coupled to each other and mounted on the chassis or skid frame 150 may be positioned within an enclosure 102 (e.g., a container or a brick and mortar facility). In various embodiments, the enclosure 102 can include a shipping container (e.g., the International Organization for Standardization (ISO) 6346 standard container).

The engine 110 can include an IC engine (e.g., a diesel engine) which converts fuel (e.g., diesel, gasoline, ethanol, natural gas, biodiesel, etc.) into mechanical energy. In some embodiments, the engine 110 includes a large engine have a volumetric capacity of equal to or greater than 95 liters. The engine 110 can include a plurality of piston and cylinders pairs (not shown) for combusting the fuel to produce mechanical energy. The engine 110 also includes a crankshaft 112 coupled to the plurality of pistons and structured to rotate in response to reciprocating motion of the pistons. The crankshaft 112 is axially aligned along a longitudinal axis $A_L$ of the genset 110 and is rotatable in a first direction along the longitudinal axis $A_L$ as shown by the arrow A in FIG. 1.

The engine 110 is operably coupled to the generator 140, via the gearbox 120 as described herein. The generator 140 may include an alternator, for example a wound rotor or permanent magnet alternator configured to convert a rotational mechanical power produced by the engine 110 into electrical energy. The generator 140 is configured to produce an electrical output. The electrical output can include a voltage and/or a current, and is proportional to the speed or torque provided by the crankshaft 112 to the generator 140. The generator 140 includes a generator shaft 144 operatively coupled to the crankshaft 112 via the gearbox 120, as described herein.

The gearbox 120 is positioned between the engine 110 and the generator 140 and operatively couples crankshaft 112 to the generator shaft 114, thereby allowing mechanical energy to be transmitted from the crankshaft 112 to the generator shaft 144 for producing electrical energy. The gearbox 120 includes a gearbox housing 122 and a gear set 130 positioned within an internal volume defined by the gearbox housing 122. The gearbox housing 122 includes a first end 121 coupled to an engine first end 111 of the engine 110. Furthermore, the gearbox housing 122 includes a second end 125 coupled to a generator first end 145 of the generator 140. The structural coupling of the engine 110, the gearbox housing 122 and the generator 140 provides enhanced mechanical stiffness and strength to the genset 100. Because of the structural coupling, the engine 110, the gearbox housing 122 and the generator 140 essentially form an integrated torque bearing structure or a "torque tube" for transmission of torque load between the coupled elements of the engine 110, the gearbox 120, and the generator 140.

Each of the engine 110, the gearbox 120 and the generator 140 are positioned on the skid frame, base frame or chassis 150. The chassis 150 may function to position the engine 110, the gearbox 120, and the generator 140 so that they may be rigidly coupled without built in assembly stresses. The increased strength of the engine 110, the gearbox 120 and the generator 140 coupling reduce torque and load bearing demands of the chassis 150, thereby allows reduction in demand on chassis 150 so as to allow strength and material of the chassis 150 to be optimized so as to reduce cost. Furthermore, rigid coupling of each of the engine 110, the gearbox 120 and the generator 140 to the chassis 150 and to each other further adds to the structural strength of the torque tube structure formed thereby.

As shown in FIG. 1, the chassis 150 includes a planar frame (e.g., a skid frame) on which the engine 110, the gearbox 120 and the generator 140 are mounted. In various embodiments, the chassis 150 can have any other shape, size or configuration. For example, the chassis 150 can include a side truss or tubular space frame positioned around and/or coupled to the engine 110, the gearbox 120 and the generator 140 to further increase torque transmission capacity, alter resonance frequency response, and increase stiffness of the resulting structure. Alternatively, the truss or space frame can be integrated inside an enclosure structured to house the genset 100, which can lower the overall height of the genset 100, reduce material usage and increase stiffness.

The gearbox housing 122 can be formed from any suitable material for absorbing torque produced by the engine 110 because of the rotation of the crankshaft 112, for example, cast iron, ductile iron, gray iron, alloys, any other suitable material or a combination thereof. For example, a first portion of the gearbox housing 122 proximate to the first end 121 and a second portion of the gearbox housing 122 proximate to second end 125 can be formed from gray iron to provide high strength and resistance to stress at the interface between the engine 110 and the gearbox housing 122, and the interface between the gearbox housing 122 and the generator 144, respectively. Moreover, a third portion of the gearbox housing 122 between the first portion and the second portion can be formed from ductile iron which has higher elasticity, thereby providing higher vibration damping and elastic deformation to accommodate torque generated by the crankshaft 112.

The gearbox housing 122 may be coupled to the chassis 150 via an interface. For example, the gearbox housing 122 can include feet including apertures for coupling the gearbox housing 122 to the chassis 150 via fasteners (e.g., screws, bolts, rivets, pins, etc.). In some embodiments, shock absorbers such as springs, rubber pads, foam pads, hydraulic dampers or any other shock absorbing assembly are positioned between the gearbox housing 122 and the chassis 150, thereby reducing the vibrations or shock transferred from the gearbox 120 to the chassis 150. In some embodiments, gearbox housing 122 may be mounted on the chassis 150 via "vibracons" or any other adjustable mount.

The gear set 130 is positioned within the internal volume defined by the gearbox housing 122 and includes a plurality of gears for providing a mechanical linkage between the crankshaft 112 and the generator shaft 144 that can provide a desired turn ratio, torque ratio, or reorient direction of rotation from the crankshaft 112 to the generator shaft 144. Expanding further, the gear set 130 includes a first gear shaft 132 coupled to a crankshaft first end of the crankshaft 112, and a second gear shaft 134 coupled to a generator shaft first end of the generator shaft 144.

The first gear shaft 132 is coupled to the crankshaft first end via a first coupling 133. In various embodiments, the first coupling 133 can include a flex plate. A flywheel (not shown) can be coupled to the crankshaft first end and coupled to the flex plate. In such embodiments, the gearbox housing 122 can be structured such that the flywheel is positioned within the internal volume defined by the gearbox housing 122, for example an internal volume defined by the first portion of the gearbox housing 122. The second gear shaft 132 and the generator shaft 144 are coupled together via a second coupling 135 which can include, but is not limited to, a rubber coupling, a spring coupling, or a viscous coupling. The rubber coupling, spring coupling, or the viscous coupling can be structured to maintain operative coupling of the second gear shaft 134 to the generator shaft 144 under varying torque conditions by allowing slight misalignment between the second gear shaft 134 and the generator shaft 144.

The gear set 130 is structured so that the crankshaft 112, at least a portion of the plurality of gears included in gear set 130 and the generator shaft 144 are axially aligned along the longitudinal axis $A_L$ of the generator set 100. In various embodiments, the gear set 130 is structured to cause the generator shaft 144 to rotate in the same direction as the crankshaft 112, i.e., the first direction shown by the arrow A. The structure coupling the gearbox housing 122 to each of the engine 110 and the generator 140 and/or the rotation of the crankshaft 112 and the generator shaft 144 in the same direction can cause each of the engine 110, the gearbox 120 and the generator 140 to react, or "torque react," in the same direction in response to the torque generated by the crankshaft 112. In other embodiments, the gearbox 120 can cause the engine 110 and generator 140 to rotate in opposite directions to cancel vibration inputs and lessening spring mounting of genset while absorbing torque reaction in the increased stiffness of the skid frame 150, engine 110, gearbox 120, and generator 140.

Any suitable arrangement or combination of gears can be used in the gear set 130 which can include, for example spur gears, helical gears, herringbone gears, worm and wheel gears, bevel gears, etc. In various embodiments, the plurality of gears included in the gear set 130 include a first pair of gears (not shown) operably coupled to crankshaft 112 and the generator shaft 144 via the first gear shaft 132 and the second gear shaft 134. The first pair of gears are axially aligned along the longitudinal axis $A_L$ of the genset 100 and can be structured to cause the generator shaft 144 to rotate in the first direction as described before.

Furthermore, the gear set 130 can also include a second pair of gears (not shown) operably coupled to the first pair of gears. The second pair of gears are axially offset from the longitudinal axis $A_L$ of the genset 100 in a vertical or horizontal direction. In some embodiments, the second pair of gears can be configured to adjust (i.e., increase or decrease) a speed or the torque provided by the crankshaft 112 to the generator shaft 144. In some embodiments, the gear set 130 can also include an auxiliary power gear (not shown) operably coupled to at least one of the plurality of gears. The auxiliary power gear is structured to be coupled to an auxiliary power source or renewable power source, for example an exhaust gas recirculation (EGR) system turbine, or an organic Rankine cycle (ORC) turbine to provide auxiliary power to the gear set 130. This can increase engine 110 efficiency or otherwise supplement the torque provided to the generator shaft 144 to increase electrical output. In various embodiments, the auxiliary power gear can also be used to drive a main oil pump fluidly coupled to the gearbox 120 to supply a lubricant therein to lubricate the gear set 130, filter the lubricant and/or exchange lubricant with an oil sump. An auxiliary oil pump (e.g., an electrical oil pump) can also be provided to provide a pre-lubrication to the gear set 130 before beginning of an operational run and/or provide backup oil supply in the event that the main oil pump fails.

In some embodiments, the gear set 130 also includes an engine turning mechanism (not shown) configured to turn the engine 110 over, for example for maintenance or repair. For example, the engine turning mechanism may include an electric powered gear and is selectively coupleable to the gear set 130. Providing power to the electric powered gear may cause the gear to couple to the gear set 130 and rotate, thereby causing the gear set 130 to rotate. This in turn rotates the crankshaft 112 so as to move a plurality of pistons positioned in a plurality of cylinders of the engine 110 to displace therewithin.

As described herein, the engine 110, the gearbox 120 and the generator 140 can be coupled together and mounted as a structurally integral unit on the chassis 150. The structural coupling allows spreading of the torque load generated by the crankshaft 112 through a gearbox housing 122 to the chassis 150, thereby reducing the load requirements of the chassis 150. Physically coupling the gearbox housing 122 to the engine 110 and the generator 140 increases the structural strength at the interface between the engine 110 and the generator 140 and reducing the torque stress on the chassis 150. This may allow for optimized design of the chassis 150 for reduced torque load so as to allow strength and material of the chassis 150 to be optimized and reduce cost.

Axial aligning of the crankshaft 112, the gearbox 120 and the generator shaft 144 as well as structural coupling of the gearbox 120 to the engine 110 and the generator 140 also reduces the overall length of the genset 100 and lowers the chassis profile, thereby allowing the genset 100 to have a lower height, less weight and smaller space requirements. This enables the genset 100 to fit more readily into enclosures and tight customer spaces, and reduces handling and shipping costs. Furthermore, the gearbox 120 can lower the number of resonant vibration frequencies, and move the remaining resonant frequencies to higher modes which are structurally less problematic.

As described before, the gear set 130 can be structured to allow rotation of the crankshaft 112 and generator shaft 144 in the same direction which causes the engine 110, the gearbox 120, and the generator 140 to react in the same direction in response to the torque produced by the crankshaft 112. This reduces overall stress on the chassis 150 and the interface between the engine 110 and the generator 140. Reducing of the load and structural strength requirements of the chassis 150 allows less structural members (e.g., cross bars, beams, etc.) to be used in the chassis 150. This can enable better access to regions below the gearbox 120 for maintenance operations and/or positioning of at least one of a gearbox oil sump for the gearbox 120, filters or other support features or assemblies, as well as allowing improved serviceability. Further, providing auxiliary power gears for recovering waste energy (e.g., via exhaust energy recovery turbines or organic Rankine cycle heat recovery) which is rerouted to main gears of the gearbox 120 increases the efficiency of the genset 110.

Figure 2:
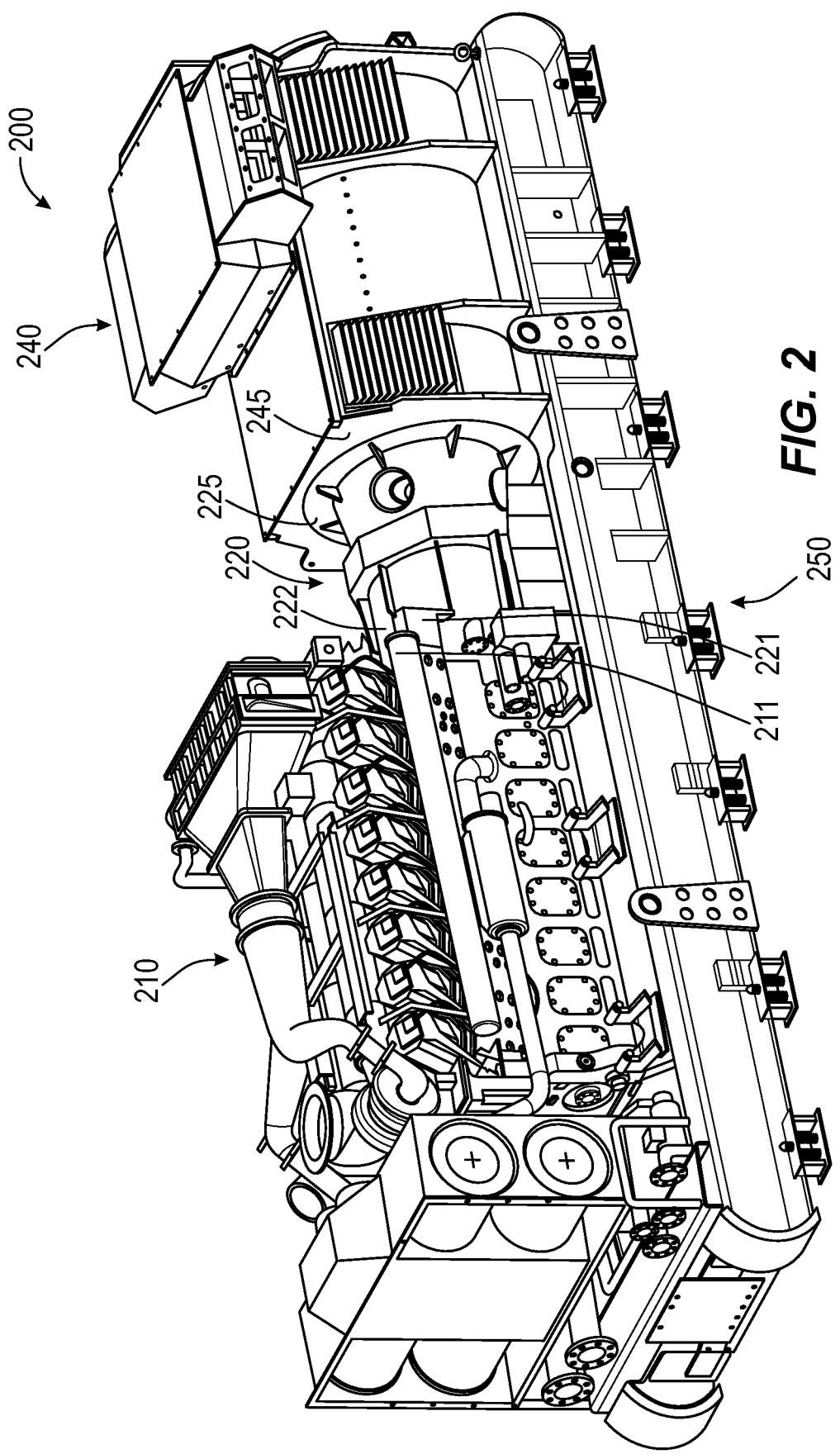
FIG. 2 is a perspective view of another embodiment of a generator set which includes an engine, a generator and a gearbox positioned therebetween operatively coupling the engine to the generator.

FIG. 2 is a perspective view of another embodiment of a genset 200. The genset 200 includes an engine 210, a gearbox 220 and a generator 240 mounted on a chassis 250. The genset 200 can be used for industrial and/or consumer electrical power generation, or any other application as described before with respect to the genset 100.

The engine 210 includes an IC engine (e.g., a diesel engine) which converts fuel (e.g., diesel, gasoline, ethanol, natural gas, biodiesel, etc.) into mechanical energy. In some embodiments, the engine 210 includes a large engine have a volumetric capacity of equal to or greater than 95 liters. The engine 210 can include a plurality of piston and cylinders pairs 214 for combusting the fuel to produce mechanical energy. The engine 210 also includes a crankshaft coupled to the plurality of pistons and structured to rotate in response to reciprocating motion of the pistons. The crankshaft is axially aligned along a longitudinal axis $A_L$ of the genset 210 and is rotatable in a first direction along the longitudinal axis $A_L$ (e.g., a clockwise or anti-clockwise direction). The engine 210 includes auxiliary components coupled thereto which can include, for example an air intake, filters, an intercooler, an exhaust gas recirculation system, an aftertreatment system or any other systems to increase the efficiency of the engine 210 and reduce exhaust emissions.

The engine 210 is coupled to the generator 240 via the gearbox 220, as described herein. The generator 240 may include an alternator, for example a wound rotor or permanent magnet alternator configured to convert a rotational mechanical power produced by the engine 210 into electrical energy. The generator 240 is configured to produce an electrical output. The electrical output can include a voltage and/or a current, and is proportional to the speed or torque provided by the crankshaft to the generator 240. The generator 240 includes a generator shaft coupled to the crankshaft via the gearbox 220, as described herein.

The gearbox 220 is positioned between the engine 210 and the generator 220 and couples crankshaft to the generator shaft 214, thereby allowing mechanical energy to be transmitted from the crankshaft to the generator shaft for producing electrical energy. The gearbox 220 includes a gearbox housing 222 and a gear set positioned within an internal volume defined by the gearbox housing 222.

The gearbox housing 222 includes a first end 221 coupled to an engine first end 211 of the engine 210. Furthermore, the gearbox housing 222 includes a second end 225 coupled to a generator first end 245 of the generator 240. Coupling can be performed via fasteners (e.g., screws, bolts, rivets, etc.) welding, fusion bonding, adhesives or any other suitable coupling mechanism. The structural coupling of the engine 210, the gearbox housing 222, and the generator 240 provides enhanced mechanical stiffness and strength to the genset 200, as described before with respect to the genset 100. Each of the engine 210, the gearbox 220, and the generator 240 are positioned on the chassis 250. The increased strength of the engine 210, the gearbox 220, and the generator 240 assembly due to structural coupling therebetween reduces torque and load bearing demands of the chassis 250, thereby allowing reduction in chassis 250 strength, material and cost.

As shown in FIG. 2, the chassis 250 includes a planar frame (e.g., a skid frame) on which the engine 210, the gearbox 220 and the generator 240 are mounted. In other embodiments, the chassis 250 can have any other shape, size or configuration. For example, the chassis 250 can include a side truss or tubular space frame positioned around the engine 210, the gearbox 220 and the generator 240 or integrated inside an enclosure structured to house the genset 200. This can lower the overall height of the genset 200, reduce material usage and increase stiffness, as described herein with respect to genset 200.

The gearbox housing 222 can be formed from any suitable material for absorbing torque produced by the engine 210 because of the rotation of a crankshaft of the engine 210, for example, cast iron, ductile iron, gray iron, alloys, any other suitable material or a combination thereof. For example, in some embodiments, a first portion of the gearbox housing 220 proximate to the first end 221 and a second portion of the gearbox housing 222 proximate to second end 225 can be formed from gray iron to provide high strength and resistance to stress at the interface between the engine 220 and the gearbox housing 222, and the interface between the gearbox housing 222 and the generator 240, respectively. Moreover, a third portion of the gearbox housing 222 between the first portion and the second portion can be formed from ductile iron which has higher elasticity, thereby providing higher vibration damping and elastic deformation to accommodate torque generated by the crankshaft. In other embodiments, the gearbox housing 222 can be monolithically formed from ductile iron. A pair of lubricant filters are positioned on an outer surface of the third portion of the gearbox housing 222. The lubricant filters can be fluidly coupled to a pump (not shown) configured to draw lubricant from lubricant reservoirs (not shown), so as to filter the lubricant before providing the lubricant to the gear set positioned within the internal volume defined by the gearbox housing 222. Such lubricant reservoirs may be positioned at any suitable location on the chassis 250, or may be remotely mounted from the chassis and fluidly coupled to the gearbox 220 via conduits.

In some embodiments, the gear set positioned within the internal volume defined by the gearbox housing 222 includes a plurality of gears for providing a mechanical linkage between the crankshaft and the generator shaft that can provide a desired turn ratio, torque ratio, or reorient direction of rotation from the crankshaft to the generator shaft. For example, the gear set can include a first gear shaft coupled to a crankshaft first end of the crankshaft, and a second gear shaft coupled to a generator shaft first end of the generator shaft.

In some embodiments, the first gear shaft is coupled to the crankshaft first end via a first coupling. In various embodiments, the first coupling can include a flex plate. A flywheel can be coupled to the crankshaft first end and coupled to the flex plate. The first portion of the gearbox housing 222 can define an internal volume shaped and sized to house the flywheel coupled to a crankshaft first end of the crankshaft proximate to the gearbox 220.

The second gear shaft and the generator shaft can be coupled together via a second coupling which can include rubber coupling, a spring coupling, or a viscous coupling. The rubber coupling, spring coupling, or the viscous coupling can be structured to maintain operative coupling of the second gear shaft to the generator shaft under varying torque conditions by allowing slight misalignment between the second gear shaft and the generator shaft. The second portion of the gearbox housing 222 can also be sized and shaped to house the viscous coupling.

In some embodiments, a sidewall of the second portion of the gearbox housing 222 is flared outwardly from the third portion to the second end 225 of the gearbox housing 222. The flaring outwardly of the second portion can, for example, allow a cross-section of the second portion at the second end 225 to be significantly larger than a cross-section of the third portion. This allows the second end 225 of the gearbox housing 222 to be physically coupled to the engine first end 211 over a larger area, thereby increasing structural strength of the interface. Furthermore, the flaring can also allow space for the rubber, spring coupling, or viscous coupling positioned within the second portion to move within an internal volume of the second portion, for example due to flexing, bending or otherwise elastic deformation of the gearbox housing 222 in response to torque exerted by the crankshaft. Ribs or other strengthening features can also be defined on the first portion, the second portion and/or the third portion of the gearbox housing 222 to increase the structural strength of the gearbox housing 222.

The gear set can be structured so that the crankshaft, at least a portion of the plurality of gears included in gear set and the generator shaft are axially aligned along the longitudinal axis $A_L$ of the generator set 100. In various embodiments, the gear set is structured to cause the generator shaft to rotate in the same direction as the crankshaft. The structural coupling the gearbox housing 222 to each of the engine 210 and the generator 240 and/or the rotation of the crankshaft 222 and the generator shaft in the same direction can cause each of the engine 210, the gearbox 220 and the generator 240 to react or otherwise torque react in the same direction in response to the torque generated by the crankshaft.

The gears included in the gear set can include a first gear and a second gear (collectively referred to herein as "the first pair of gears") operably coupled to crankshaft and the generator shaft via the first gear shaft and the second gear shaft, respectively. The first pair of gears can be positioned to be axially aligned along the longitudinal axis $A_L$ of the genset 200 and can be structured to cause the generator shaft to rotate in the first direction as described before.

In some embodiments, the gear set also includes an auxiliary power gear operably coupled the first pair of gears. The auxiliary power gear is structured to be operably coupled to an auxiliary power source, for example an exhaust gas recirculation turbines, or organic Rankine cycle turbine to provide auxiliary power to the gear set. This can increase engine 210 efficiency or otherwise supplement the torque provided to the generator shaft to increase electrical output. In various embodiments, the auxiliary power gear can also be used to drive a main oil pump fluidly coupled to the gearbox 220 to supply a lubricant therein to lubricate the gear set (e.g., from the lubricant reservoirs), filter the lubricant and/or exchange lubricant with an oil sump. An auxiliary oil pump (e.g., an electrical oil pump) can also be provided to provide a pre-lubrication to the gear set before beginning of an operational run and/or provide backup oil supply in the event that the main oil pump fails.

The gear set can also include an engine turning mechanism configured to turn the engine 210 over, i.e., rotate the crankshaft without starting the engine 210, for example for maintenance or repair. For example, the engine turning mechanism may include an electric powered gear and is selectively coupleable to the gear set. Providing power to the electric powered gear may cause the gear to couple to the gear set and rotate, thereby causing the gear set to rotate. This in turn rotates the crankshaft so as to move a plurality of pistons positioned in a plurality of cylinders of the engine to displace therewithin.

In some embodiments, some or all of the gears included in the gear set include spur gears. In other embodiments, any other gear set can be included in the gearbox 220, such as a gear set including helical gears.

As described herein, the engine 210, the gearbox 220 and the alternator 240 are coupled together and mounted as a structurally integral unit on the chassis 250. The structural coupling allows spreading of the torque load generated by the crankshaft through the gearbox housing 222 (or 322) to the chassis 250, thereby reducing the load requirements of the chassis 250. Physically coupling the gearbox housing 222 to the engine 210 and the generator 240 increases the structural strength at the interface between the engine 210 and the generator 240 and reducing the torque stress on the chassis 250. This may allow for optimized design of the chassis 250 for reduced torque load so as to allow strength and material of the chassis 250 to be optimized and reduce cost.

Axial aligning of the crankshaft, the gearbox 220 and the generator shaft as well as structural coupling of the gearbox 220 to the engine 210 and the generator 240 allows the genset 200 to have smaller overall length relative to other gensets which include a standalone gearbox or is not axially aligned. Axial alignment also enables the genset 200 to have a lower chassis profile, and a smaller "moment arm" in their mounting from the skid to apply reaction torque across, thereby allowing the genset 200 of have a smaller height, increased stiffness, less weight and have smaller space requirements. This enables the genset 200 to fit more readily into enclosures and tight customer spaces and reduces handling and shipping costs. Furthermore, the gear set is structured to allow rotation of the crankshaft and generator shaft in the same direction which causes the engine 210, the gearbox 220 and the generator 240 to torque react in the same direction. This reduces overall stress on the chassis 250 and the interface between the engine 210 and the generator 240, as described with respect to the genset 200.

Figure 3:
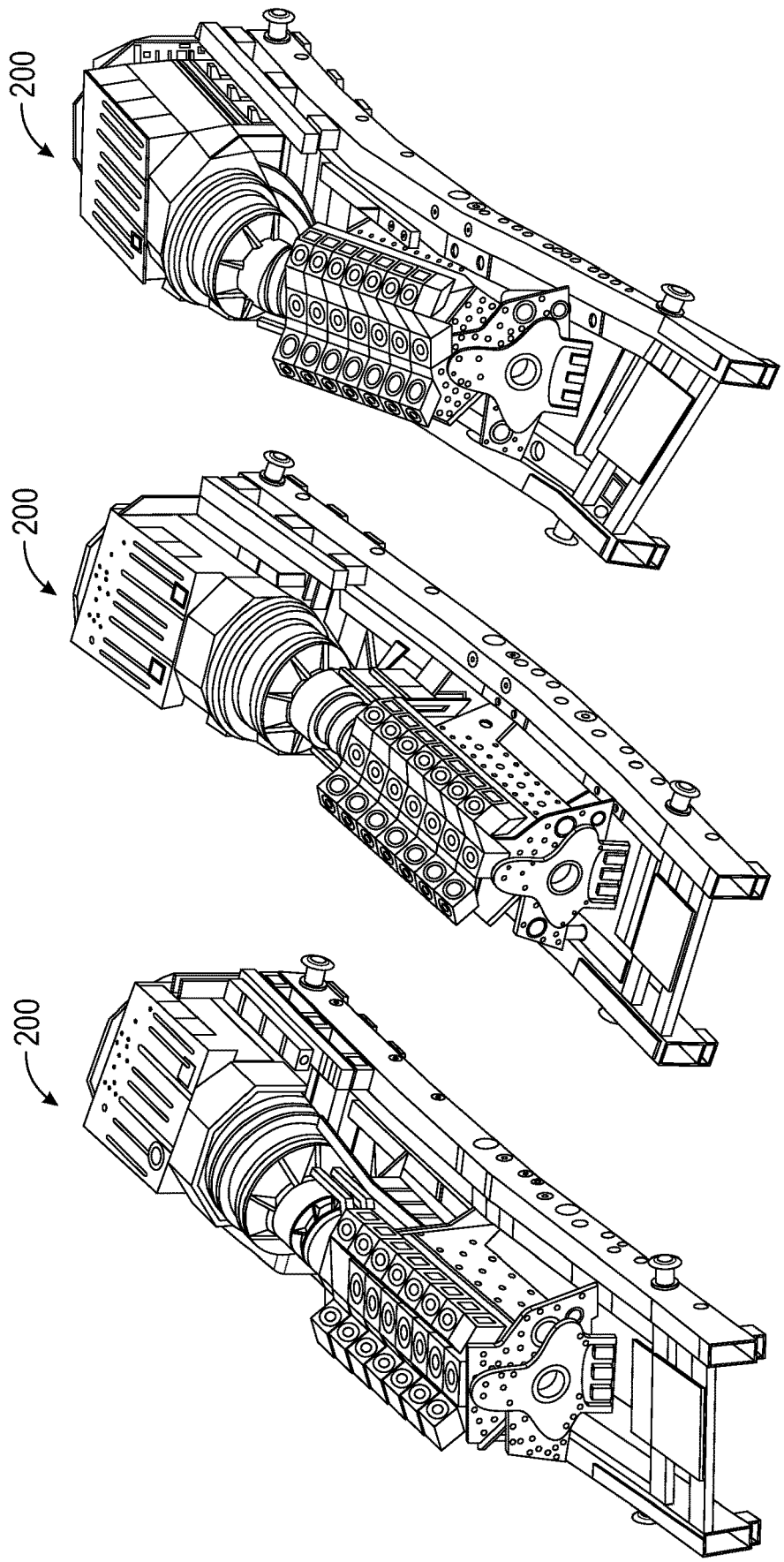
FIGS. 3A-C are finite element analysis (FEA) model of various mode of vibrations of the genset of FIG. 2.

The gearbox 220 can increase the resonant frequencies to higher modes which are structurally less problematic. For example, FIGS. 3A-3C are finite element analysis models of a genset that includes a gearbox similar to the gearbox of FIG. 2 according to an exemplary implementation. Various modes of vibration of the genset 200 are shown in FIGS. 3A-3C. For this genset, it was determined that the twisting natural frequency of the generator set drops by about 40% when the fasteners coupling the gearbox to both the engine and generator are removed. The vertical bending mode natural frequency also drops by about 58%, thereby highlighting the increase in stiffness provided by structurally coupling the gearbox to the engine and the generator.

In some embodiments, the gearbox 120/220 can also include a first flange rigidly coupling the first end 121/221 of gearbox housing 122/222 to the engine first end 111/211 and/or a second flange rigidly coupling the second end 125/225/to the generator second end 145/245. Various embodiments of flanges, adaptors and coupling mechanisms for coupling the gearbox 120/220 or any other gearbox described herein to the engine and/or the generator are described in European Patent Application No. 15176912.2, filed Aug. 15, 2015 and entitled "Adaptor", the entire disclosure of which is incorporated herein by reference.

Figure 4:
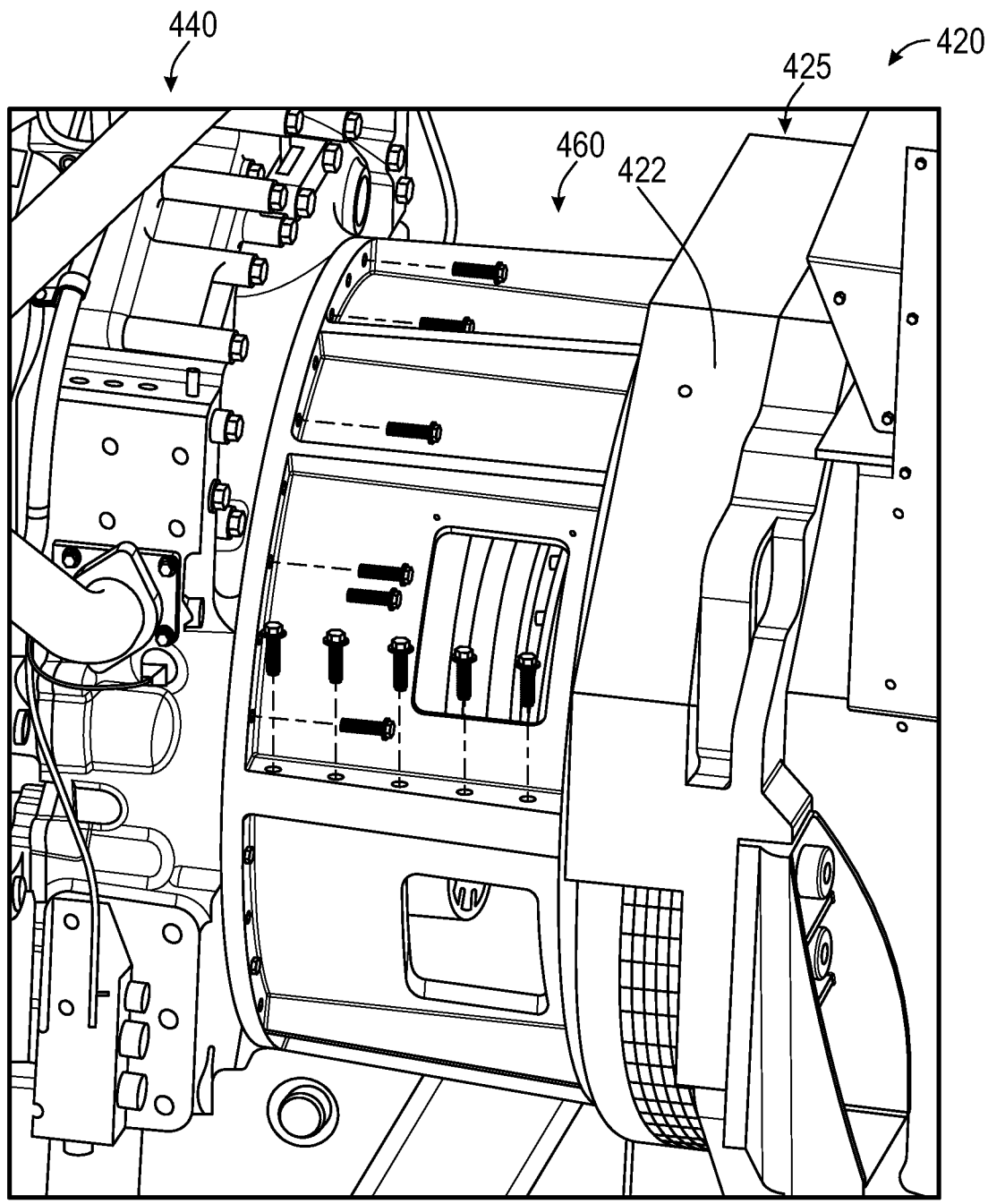
FIG. 4 is a perspective view of a portion of a genset assembly showing an adaptor rigidly coupling a second end of a gearbox to a generator first end.

For example, FIG. 4 is a perspective view of a portion of a gearbox 420 showing an end 425 of a gearbox housing 422 of the gearbox 420 rigidly coupled to an alternator first end of a generator 440 via an adaptor 460. The generator 440 can be substantially similar to the generator 140 or 240 described herein, and therefore not described in further detail herein. In some embodiments, an opposite end of the gearbox housing 422 can also be coupled to an engine first end of an engine (e.g., the engine 110 or 210) via the adaptor 460.

Figure 5:
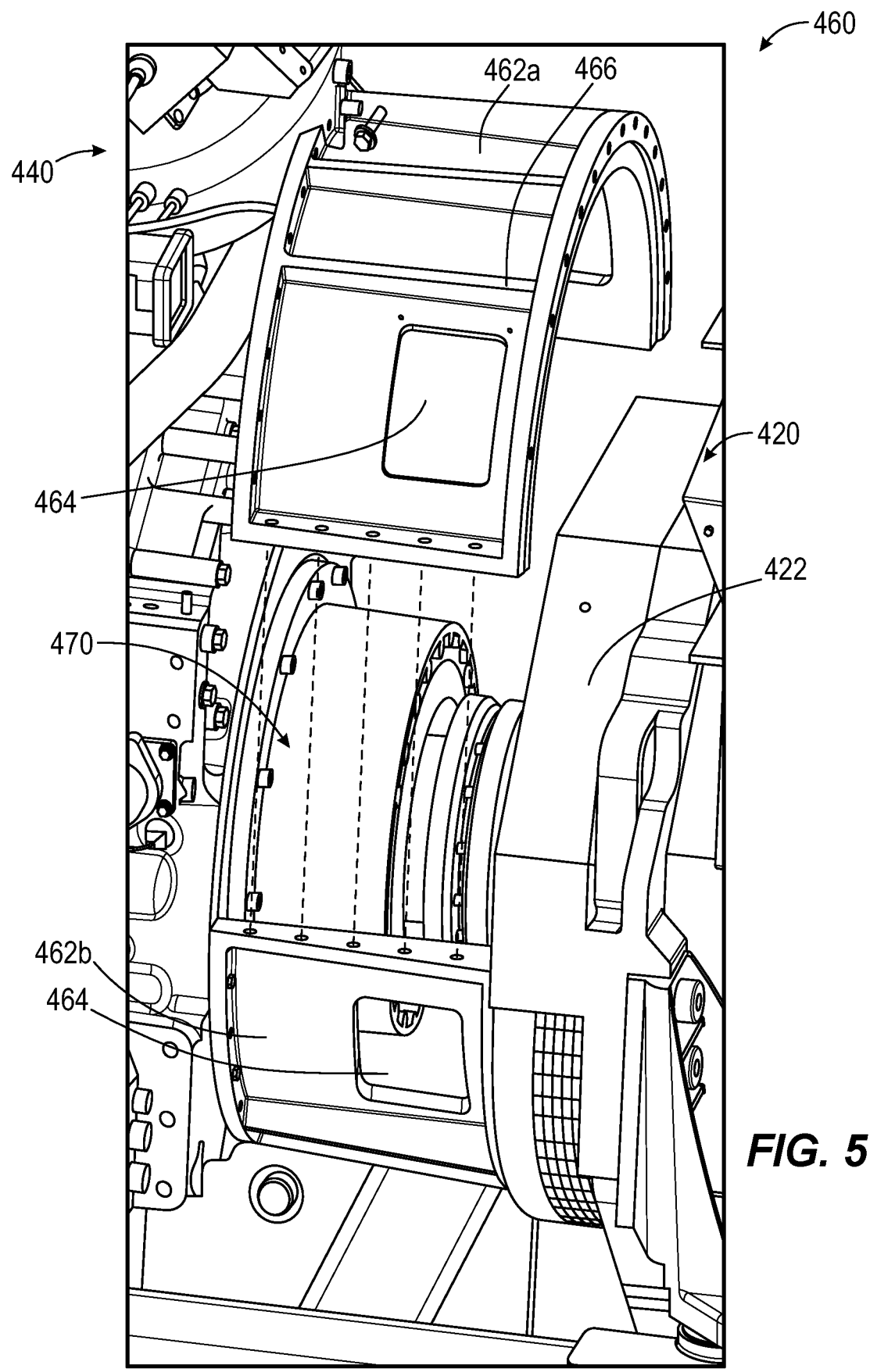
FIG. 5 is another perspective view of the genset assembly of FIG. 4 showing a first piece of the adaptor uncoupled from a second piece of the adaptor.
Figure 6:
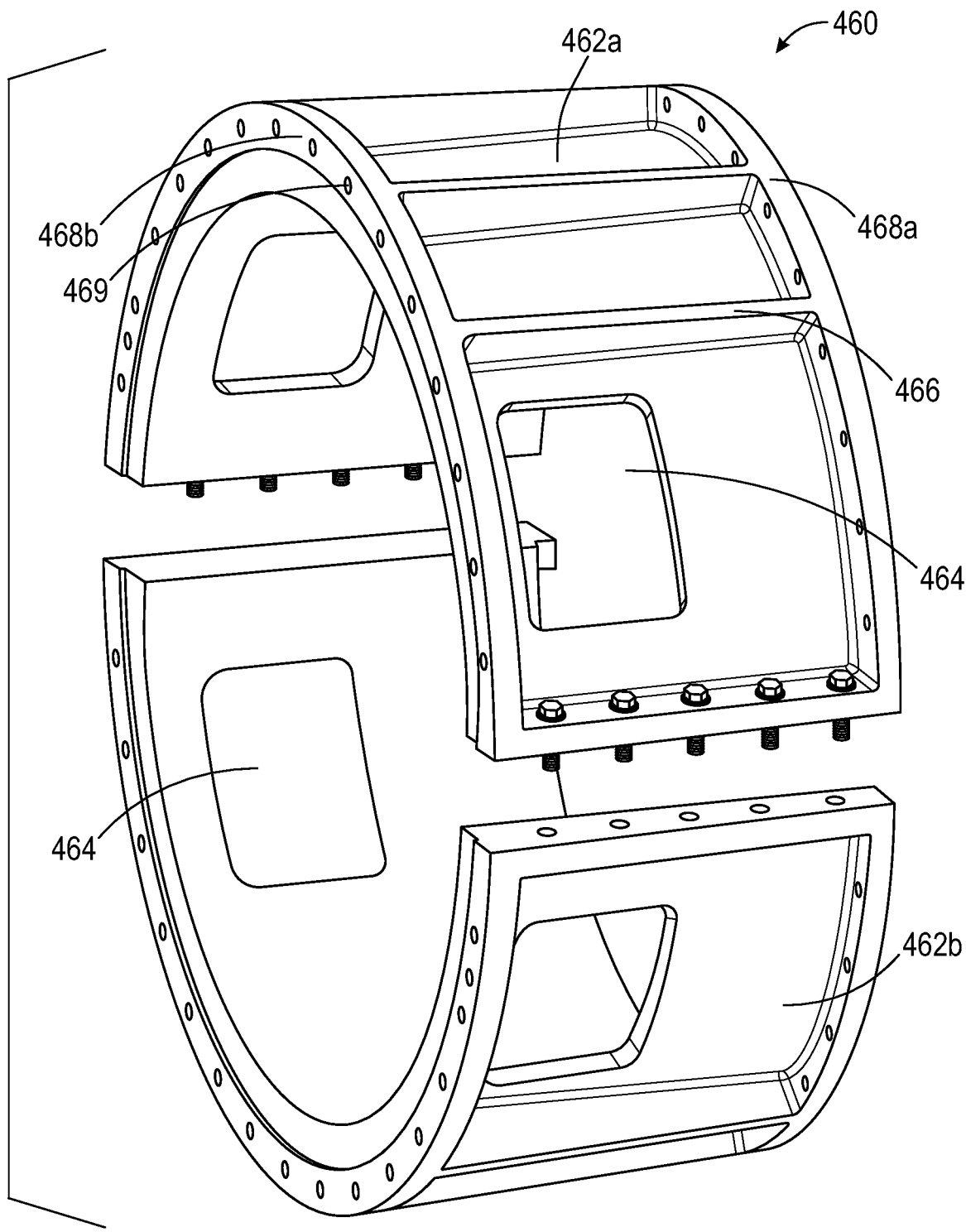
FIG. 6 is an exploded view of the adaptor of FIG. 4.

The adaptor 460 includes a first piece 462a and a second piece 462b removably coupled to each other via fasteners (e.g., screws, nuts, bolts, etc.), as shown in FIG. 5. FIG. 6 is an exploded view of the adaptor 460. Each of the first piece 462a and the second piece 462b include a first flange portion 468a structured to interface with and couple to the first end of the gearbox housing 422, and a second flange portion 468b structured to interface with and couple to the generator first end of the generator 440. Throughholes 469 are defined through each of the first flange portion 468a and the second flange portion 468b. Fasteners such as screws, bolts, pins, etc., can be inserted through the throughholes into the gearbox housing 422 and the generator 440 to rigidly couple the adaptor 460 thereto.

Each of the first piece 462a and the second piece 462b define a plurality of openings 464. The openings 464 allow users to access a coupling assembly 470 positioned within the adaptor 460 without removing the adaptor 460, for example to perform maintenance operations. Furthermore, the first piece 462a may be uncoupled from the second piece 462b to facilitate replacement of the coupling assembly 470, without completely uncoupling the gearbox housing 422 from the generator 440 (or the engine). A plurality of ribs 466 are also positioned on an outer surface of the adaptor 460. The ribs 466 provide additional structural strength while allowing reduction in weight of the adaptor 460.

Figure 7:
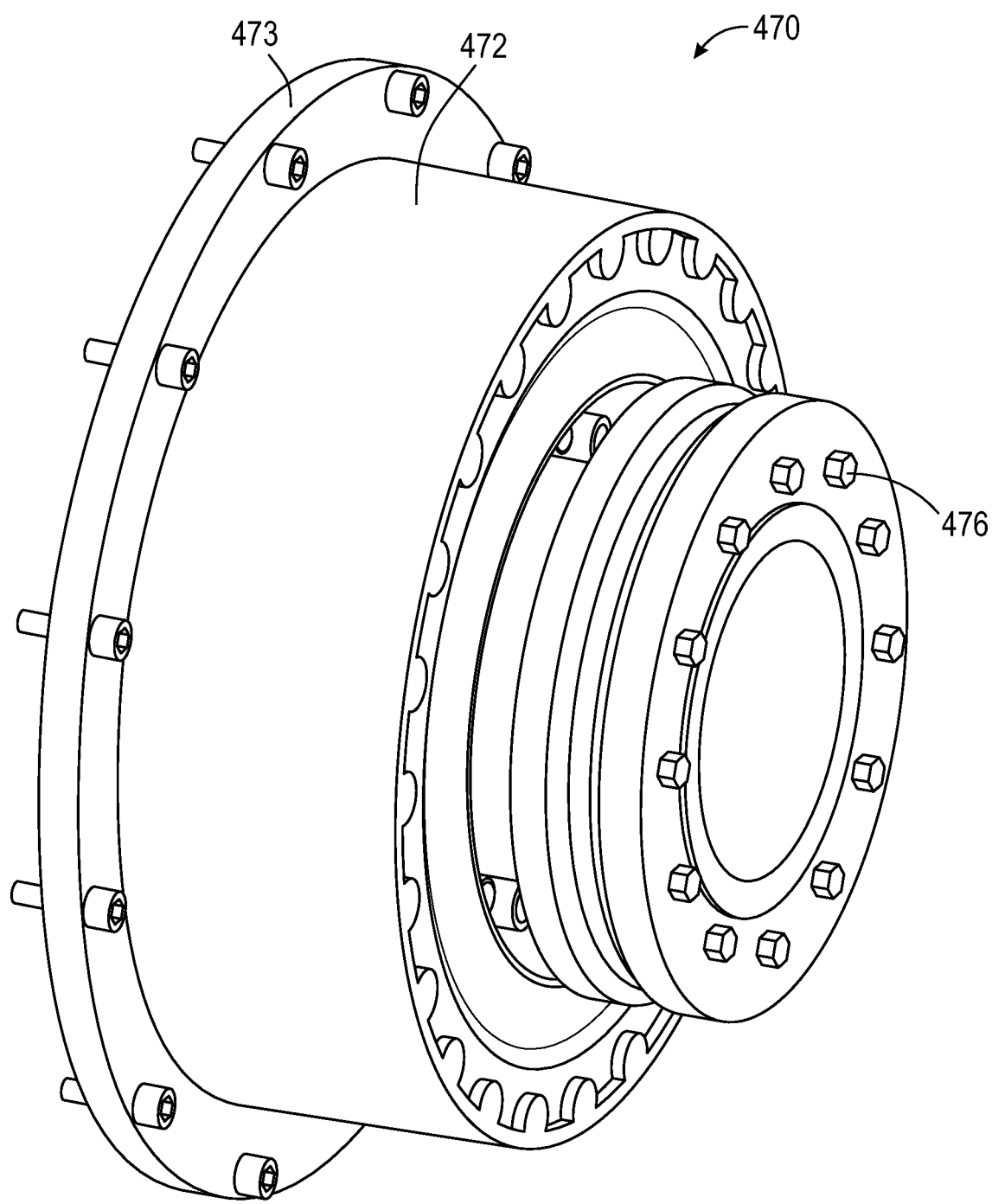
FIG. 7 is a perspective view of a flexible coupling assembly coupling the gearbox of FIG. 9 to a generator first end and a generator shaft of the generator.
Figure 8:
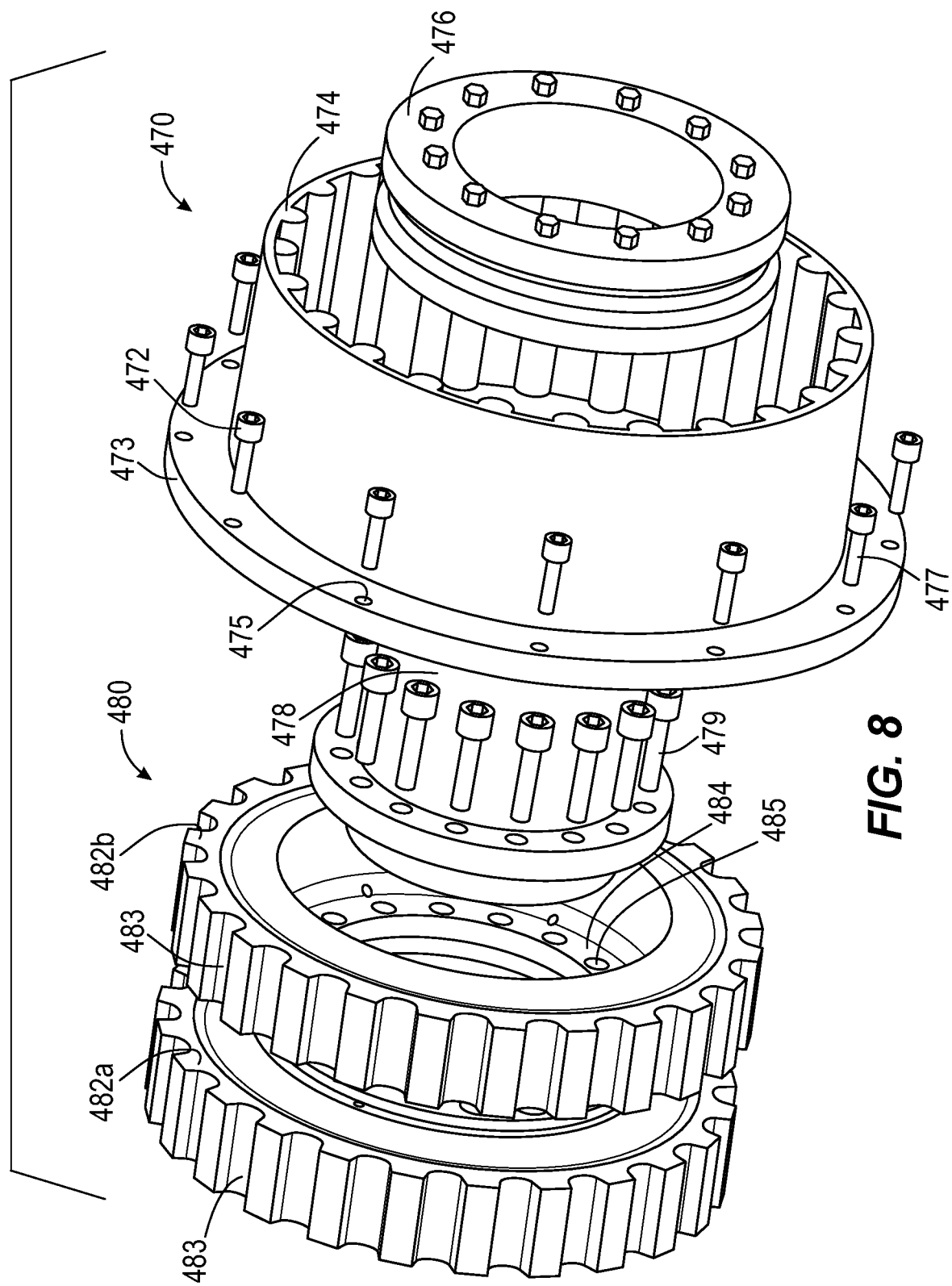
FIG. 8 is an exploded view of the flexible coupling assembly of FIG. 7.
Figure 9:
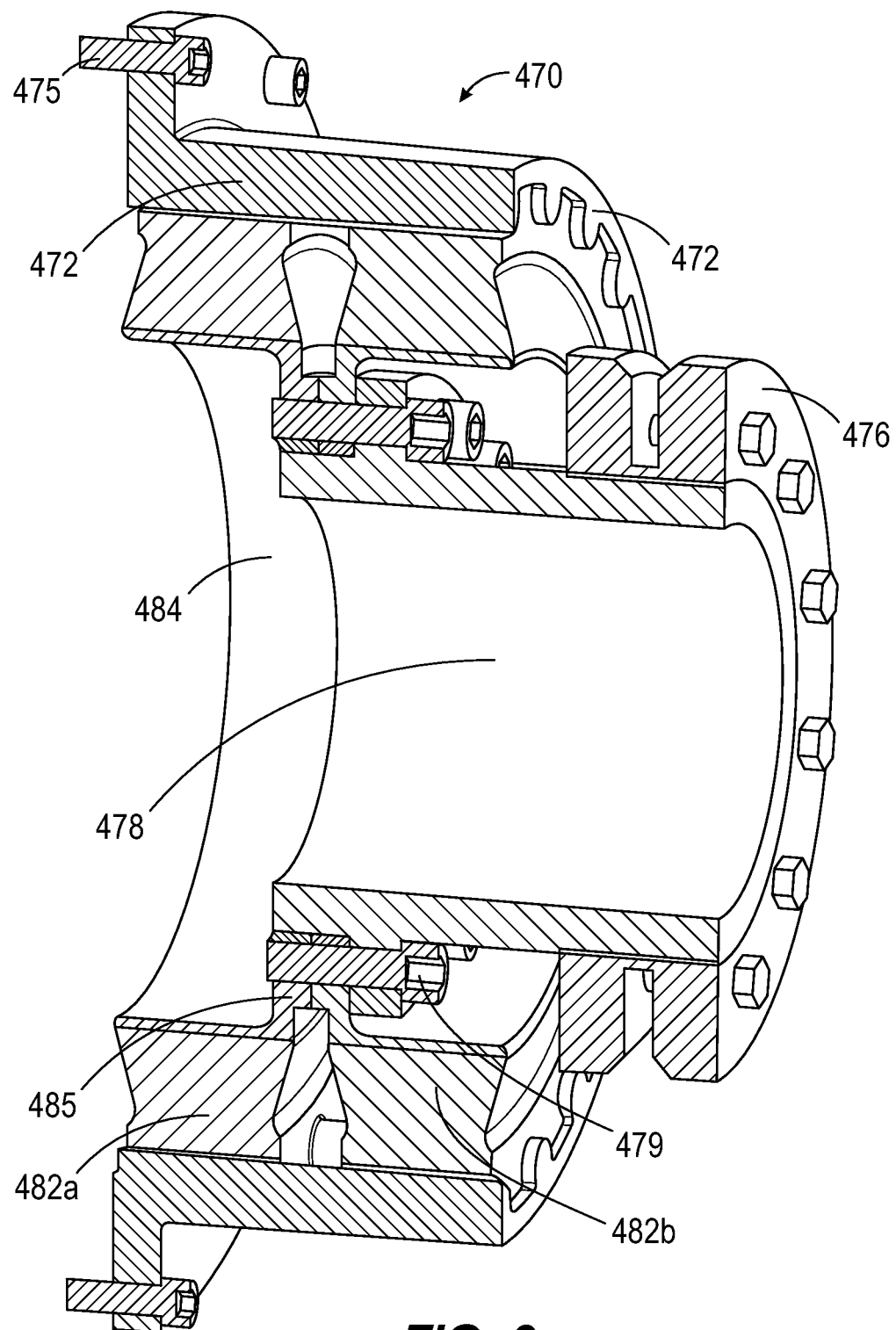
FIG. 9 is a side cross-section view of the flexible coupling assembly of FIG. 7.

FIGS. 7-9 show a perspective view, an exploded view and a side cross-section view, respectively of a coupling mechanism 470 which can be used to operatively couple a second gear shaft of the gear box 420 or any other gearbox described herein to a generator shaft of the generator 440 or any other generator described herein (e.g., the generator 140 or 240). In some embodiments, the coupling mechanisms 470 can also be used to couple a first gear shaft of the gearbox 420 to a crankshaft of an engine (e.g., the crankshaft 112/212 of the engine 110/210).

The coupling assembly 470 includes a flange 472 including a flange segment 473 defining a plurality of flange throughholes 475 and structured to be positioned on the generator first end of the generator 440 within the adaptor 460. Fasteners 477 (e.g., screws or bolts) are inserted through the flange throughholes 475 to removably couple the flange segment 473 and thereby the flange 472 to the generator shaft of the generator 440 (or any other generator shaft of any generator described herein) or a crankshaft of any engine described herein), for example via a clutch plate (not shown).

A flexible coupling assembly 480 is positioned within the flange 472. The flexible coupling assembly 480 includes a first flexible coupler 482a and a second flexible coupler 482b (collectively referred to herein as "the flexible couplers 482"). The flexible couplers 482 include circular elements and define a plurality of grooves 483 on an outer circumference thereof. The plurality of grooves 483 correspond to a plurality of ridges 474 defined on an inner surface of the flange 472 so that the flexible couplers 482 can be immovably positioned within the flange 474. The flexible coupler s 482 can be formed from any suitable flexible material, for example rubber, silicone, polymers, etc.

Each of the flexible couplers 482 include a coupler flange segment 484 defining a coupler channel therethrough. The coupler flange segment 484 defines a plurality of coupler throughholes 485 structured to receive fasteners 479 for coupling a hollow sleeve 478 thereto. The sleeve 478 defines a sleeve channel therethrough for receiving at least a portion of a first gear shaft or a second gear shaft, as described herein. A locking assembly 476 is coupled to the sleeve 478 at a distal end of the sleeve relative to the flexible couplers 482 to removably couple the first generator shaft or the generator shaft to the sleeve 478.

In this manner, the first or second generator shaft is coupled to the sleeve 478 while the flange 472 is coupled to the generator shaft or the crankshaft. Furthermore, the flange 472 and the sleeve 478 are operatively coupled to each other via the flexible couplers 482. During operation, the flexible couplers 482 may flex to allow slight rotational motion of the sleeve 478 relative to the flange 472, thereby allowing slight axial misalignment as well as torsional stresses due to torque generated by the crankshaft or the generator shaft.

Figure 10:
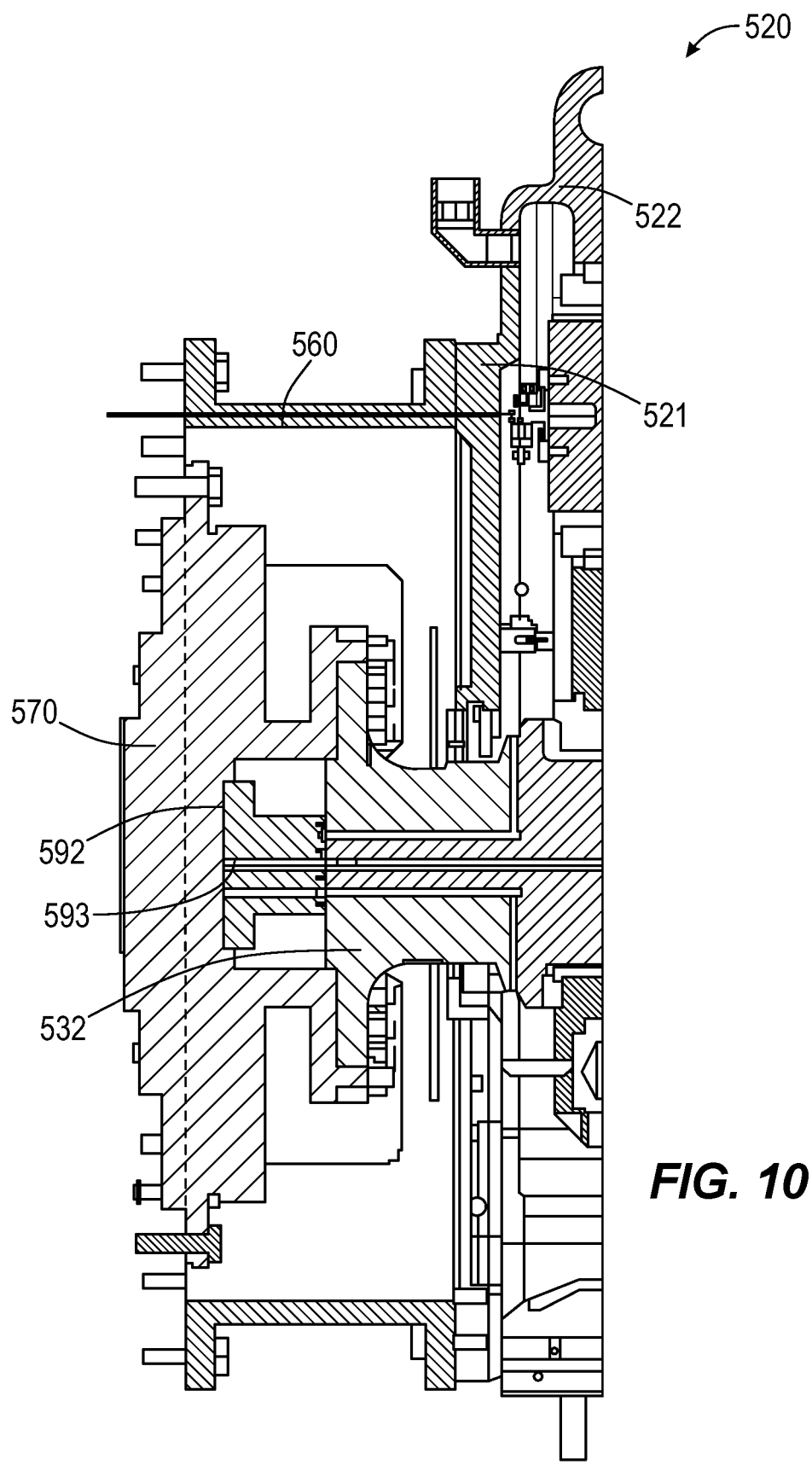
FIG. 10 is a side cross-section view of a gearbox showing an elastic coupling for coupling a first gear shaft and/or a second gear shaft to a crankshaft or a generator shaft, respectively.

In some embodiments, a first gear shaft and/or a second gear shaft of a gearbox maybe coupled to a crankshaft or a generator shaft, respectively via a torsionally elastic coupling. For example, FIG. 10 is a side cross-section of a gearbox 520 according to an embodiment. The gearbox 520 can be substantially similar to the gearbox 120, 220, 420 or any other gearbox described herein. An elastic coupling 570 is positioned within a portion of an adaptor 560. The adaptor 560 is structured to couple a first end 521 of the gearbox housing 522 to an engine first end of an engine (e.g., the engine first end 111/211 of the engine 110/210). In some embodiments, the adaptor 560 can be substantially similar to the adaptor 460 described in detail herein.

Figure 11:
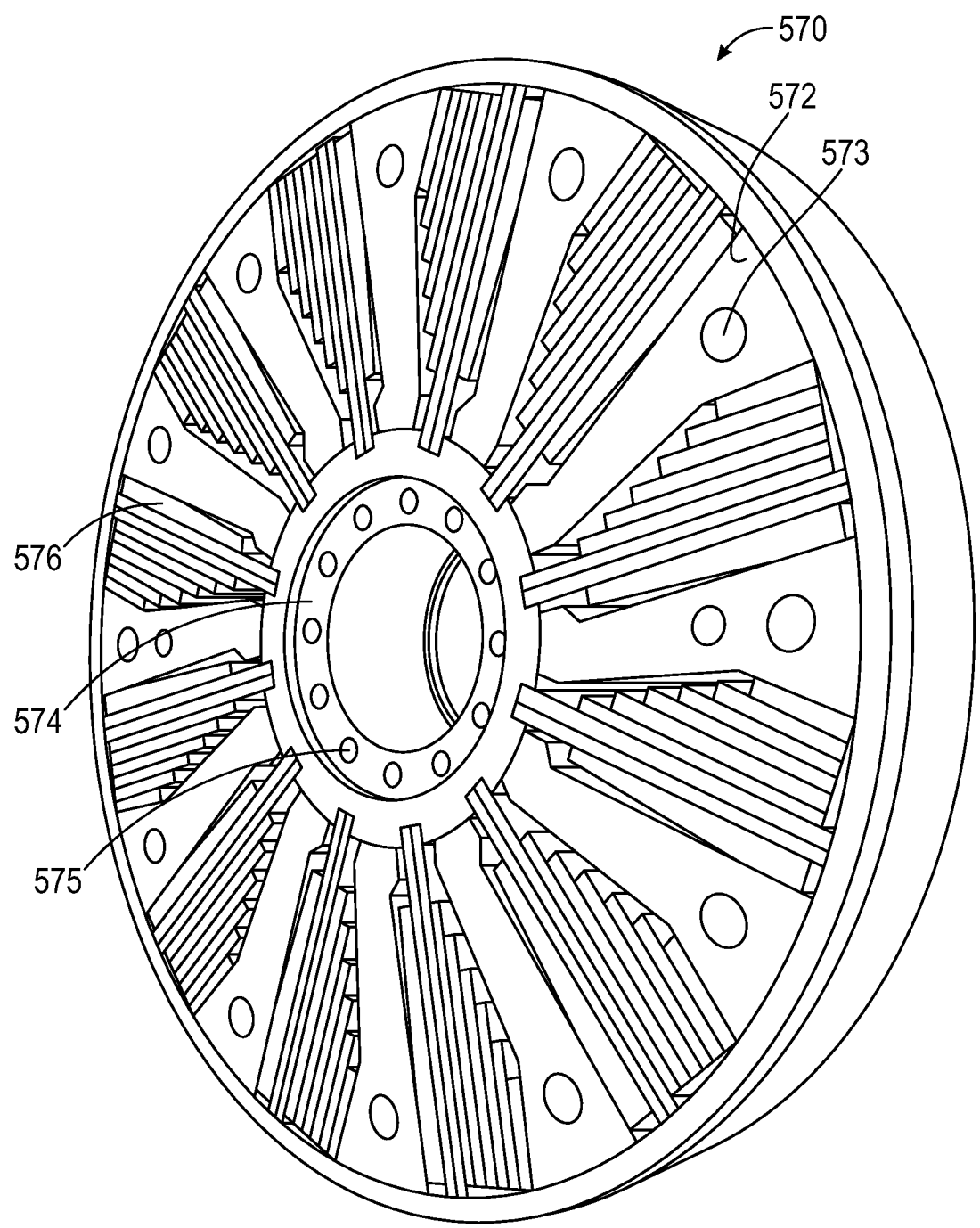
FIG. 11 is a perspective view of the elastic coupling of FIG. 10.

FIG. 11 is a perspective view of the elastic coupling 570 according to an embodiment. In some embodiments, the elastic coupling 570 can include a Geislinger coupling. The elastic coupling 570 includes a circular member which includes a first series of throughholes 573 defined on an outer portion 572 thereof. The first series of throughholes 573 are configured to receive fasteners (e.g., screws, bolts etc.) for removably coupling the elastic coupling 570 to a crankshaft or a generator shaft. Furthermore, the elastic coupling 570 includes an inner portion 574 defining a second series of throughholes 575. The second series of throughholes 575 are also structured to receive fasteners to couple a first gear shaft 532 or the second gear shaft to the elastic coupling 570.

The outer portion 572 is structurally coupled to the inner portion via high-damping members 576 (e.g., high-damping steel springs) such that the elastic coupling 570 is torsionally elastic and provides hydrodynamic damping. The elastic coupling 570 provides high reliability, long service life and low life-cycle costs. In various embodiments, an interface sleeve 592 may be coupled to the inner portion. The interface sleeve 592 defines a channel 593 for providing oil, for example gear oil or engine oil, to the inner portion of the elastic coupling 570.

Figure 12:
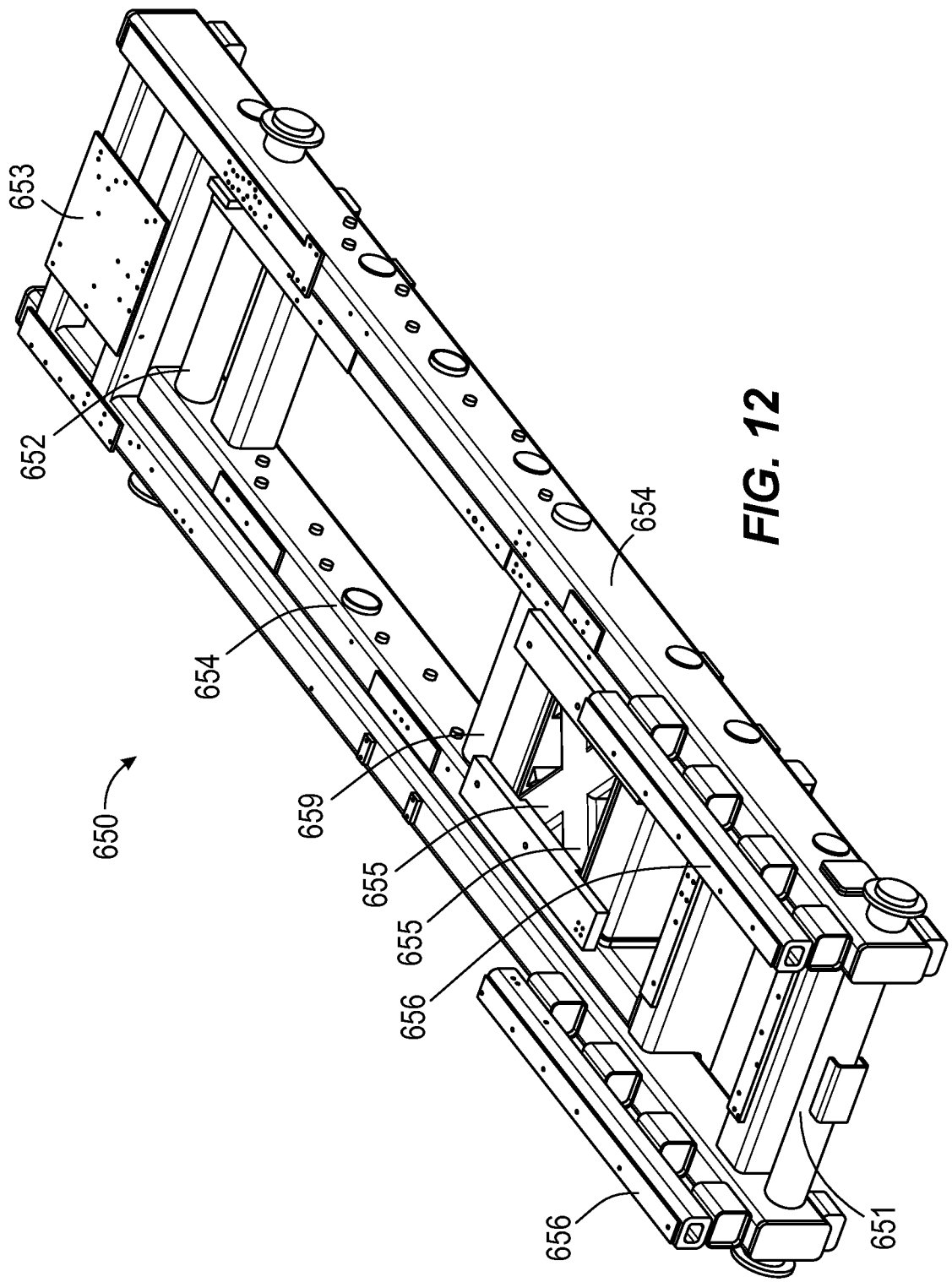
FIGS. 12 and 13 are perspective views of a chassis for mounting and rigidly securing the engine, the gearbox and the generator thereon.
Figure 13:
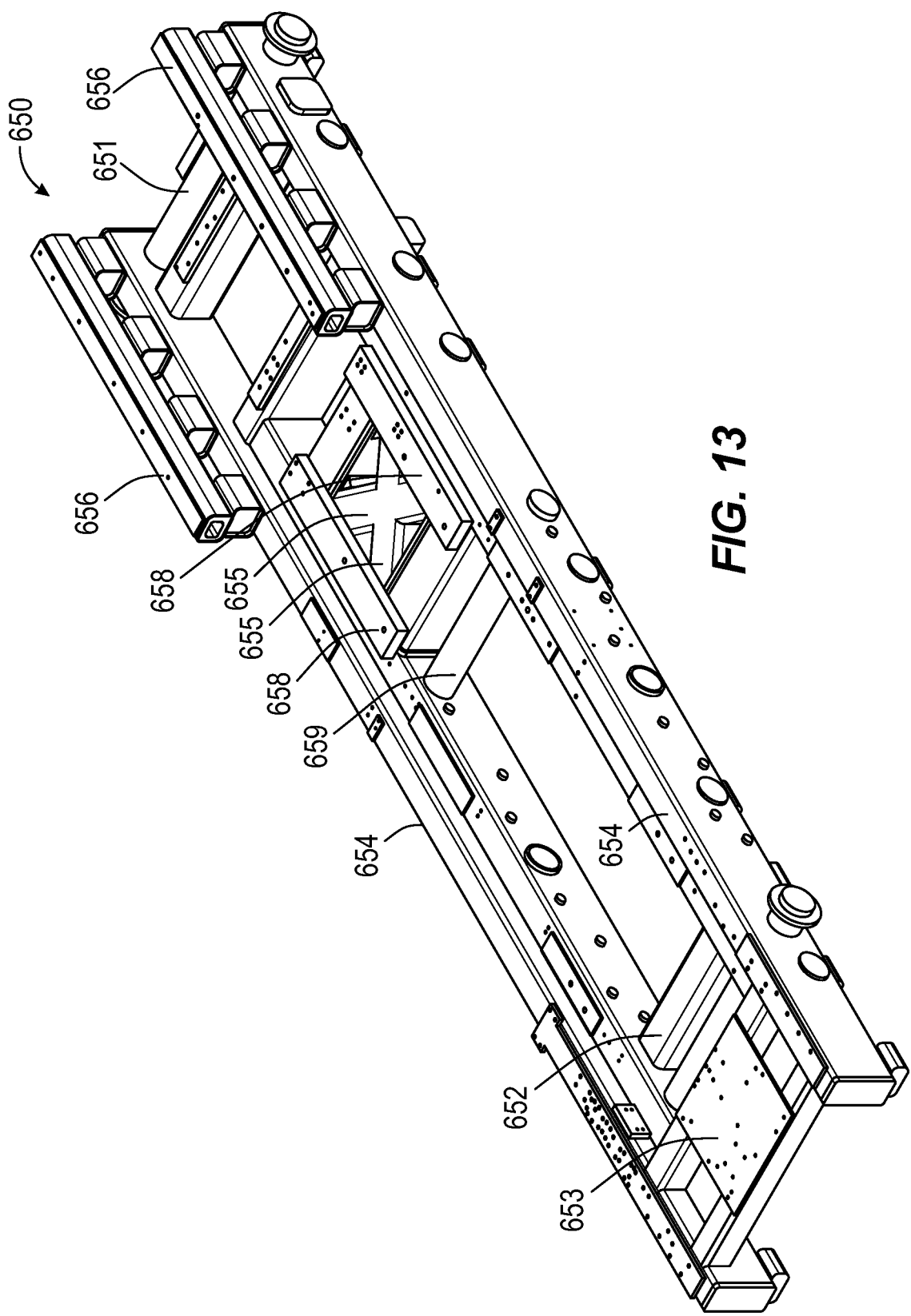

FIGS. 12 and 13 are perspective views of an embodiment of a skid frame or chassis 650 which can be used for rigidly mounting an engine, a gearbox and a generator included in a genset assembly (e.g., the genset assembly 100, 200, or any other genset assembly described herein) thereon. The skid frame 650 includes outer beams 654. A first rigid cross-beam 651 is positioned orthogonally between the beams 654 and rigidly coupled thereto proximal to a first end of the skid frame 650. A second rigid cross-beam 652 is positioned orthogonally between the beams 654 and rigidly coupled thereto proximal to a second end of the skid frame 650. Furthermore, a third rigid cross-beam is positioned orthogonally between the beams 654 and rigidly coupled thereto proximal to a center of the skid frame 650. The first cross-beam 651, the second cross-beam 652, and the third cross-beam 659 may be structured to provide structural strength, for example to resist torsion or bending at various locations of the skid frame 650. In some embodiments, one or more of the first cross-beam 651, the second cross-beam 652, and the third cross-beam 659 may include round lift tubes for lifting the chassis 650, and/or coupling the beams 654 to each other.

A first cross member 652 is positioned orthogonally between the beams 654 and rigidly coupled thereto proximal to a first end of the skid frame 650. The first end corresponds to a portion of the skid frame on which an engine (e.g., the engine 110, 210 or any other engine described herein) is mounted. A first plate 653 is also positioned proximal to the first end. The first cross-beam 652 may provide structural strength while the first plate 653 may be used for mounting genset accessories and to provide structural strength, for example by resisting twisting and bending at the corresponding end of the chassis.

A second rigid cross-beam 659 is positioned proximal to a center of the skid frame 650. The second cross-beam 659 is structured to provide structural strength of torsion resistance to the skid frame 650 proximal to a location of the genset assembly wherein the gearbox couples to the engine. A series of X beams 655 are positioned proximate to the second cross-beam corresponding to a portion of the skid frame 650 where the gearbox is positioned. The X beams 655 may include a sub-assembly coupled to chassis 650, or alternately integrated with the chassis, for providing additional structural strength of the skid frame 650 to counter the high torque forces acting on the gearbox.

A gearbox housing of the gearbox positioned on the skid frame 650 (e.g., the gearbox 120, 220, 420, 520, or any other gearbox defined herein) may be coupled to the chassis 650 via an interface. For example, the gearbox housing can include feet including apertures for coupling the gearbox housing to the skid frame 650 via fasteners (e.g., screws, bolts, rivets, pins, etc.). In some embodiments, shock absorbers such as springs, rubber pads, foam pads, vibracons, hydraulic dampers or any other shock absorbing assembly can positioned between the gearbox housing and the skid frame 150. The skid frame 650 also includes rails 658 for mounting the gearbox thereon. The gearbox can be moved along the rails so as to accommodate different length engines or generators on the skid frame 650.

In some embodiments, a gearbox oil tank (not shown) may be remotely mounted from the chassis 650 and be fluidly coupled to the gearbox via conduits. In other embodiments, the gearbox oil tank maybe mounted at any suitable location on the chassis 650 A pair of second beams 656 is positioned vertically offset from the outer beams 654 so that the pair of second beams 656 are higher than the outer beams 654. The pair of second beams 656 are structured to provide a raised structure for mounting the generator on the skid frame 650 (i.e., providing a generator frame), for example to allow axial alignment of a generator shaft of the generator with a second gear shaft of the gearbox. In some embodiments, the vertically offset pair of second vertical beams 656 may be excluded.

Figure 14:
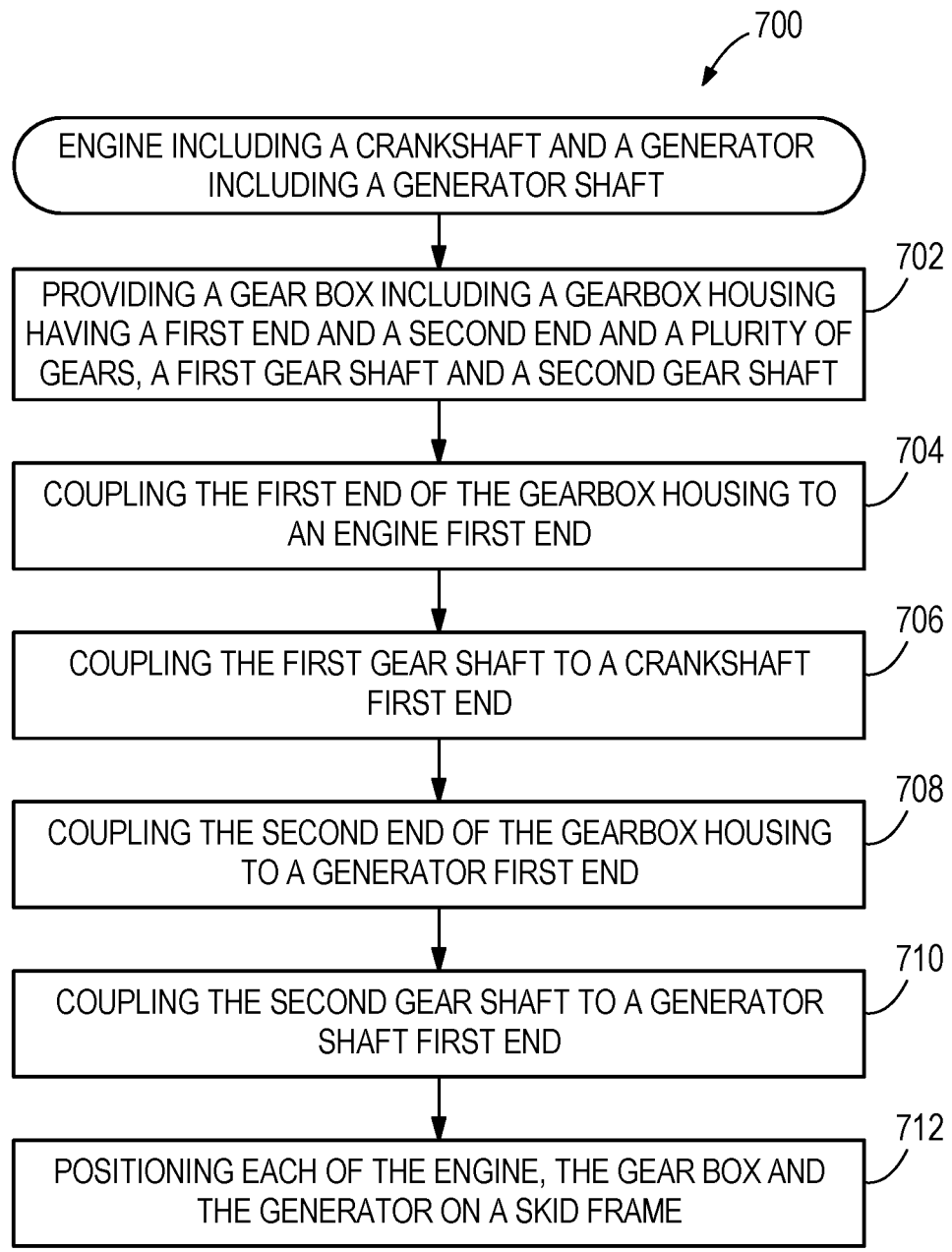
FIG. 14 is a method of operatively coupling an engine to a generator via a gearbox coupled to the engine and generator and structured to axially align the crankshaft of the engine and the generator shaft.

FIG. 14 is a schematic flow diagram of an example method 700 for mechanically coupling an engine including a crankshaft (e.g., the engine 110/210 including the crankshaft 112/212) to a generator including a generator shaft (e.g., the generator 140/240 including the generator shaft 144/244) using a gearbox (e.g., the gear box 120, and/or 220) as described herein. The method 700 includes providing a gearbox housing having a first end, a second end and a plurality of gears, a first gear shaft and a second gear shaft at 702. For example, the gearbox can include the gearbox 120, 220, or any other gearbox described herein. The gearbox 120/220 include the first end 121/221, the second end 125/225, and a plurality of gears. The plurality of gears also include a first gear shaft 132/232 and a second gear shaft 134/234 coupled to at least a portion of the plurality of gears.

The first end of the gearbox housing is coupled to an engine first end of the engine at 704. For example, the first end 121/221 of the gearbox housing 122/222 is coupled using fasteners or any suitable coupling means as described herein to the engine first end 111/211 of the engine 110/210. The first gear shaft is coupled to a crankshaft first end of the crankshaft at 706. For example, a flywheel can be coupled to the crankshaft first end of the crankshaft 112/212 of the engine 110/210 and the first gear shaft 132/232 is operatively coupled to the flywheel via a first coupling 133/233 such as a flex plate.

The second end of the gearbox housing is coupled to a generator first end of the generator at 708. For example, the second end 125/225 of the gearbox housing 122/222 is coupled to the generator first end 145/245 of the generator 140/240 using fasteners or any suitable coupling components as described herein. The second gear shaft is coupled to a generator shaft first end of the generator at 710. For example, the second gear shaft 134/234 is coupled to the generator shaft 144/244 via a second coupling 135/235, for example a rubber coupling or viscous coupling, as described herein.

Each of the engine, the gearbox and the generator are positioned on a chassis and rigidly coupled thereto at 712. For example, the engine 110/210, the gearbox 120/220 and the generator 140/240 are positioned on the chassis 150/250. In some embodiments, the engine, the gearbox and the generator are first positioned on the chassis before being coupled to each other. The physical coupling of the engine, the gearbox housing and the generator increases the structural strength of the genset assembly as described herein. Furthermore, the gearbox (e.g., the gearbox 120 and/or 220) is positioned so that the crankshaft (e.g., the crankshaft 112/212), at least a portion of the plurality of gears and the generator shaft (e.g., the generator shaft 144/244) are axially aligned. The gearbox (e.g., the gearbox 120 and/or 220) can be structured to cause the generator shaft to rotate in the same direction as the crankshaft. The rotation in the same direction and structural coupling of the engine, the gearbox and the generator causes the engine, the gearbox and the generator to react in the same direction in response to a torque generated by the crankshaft.

Figure 15:
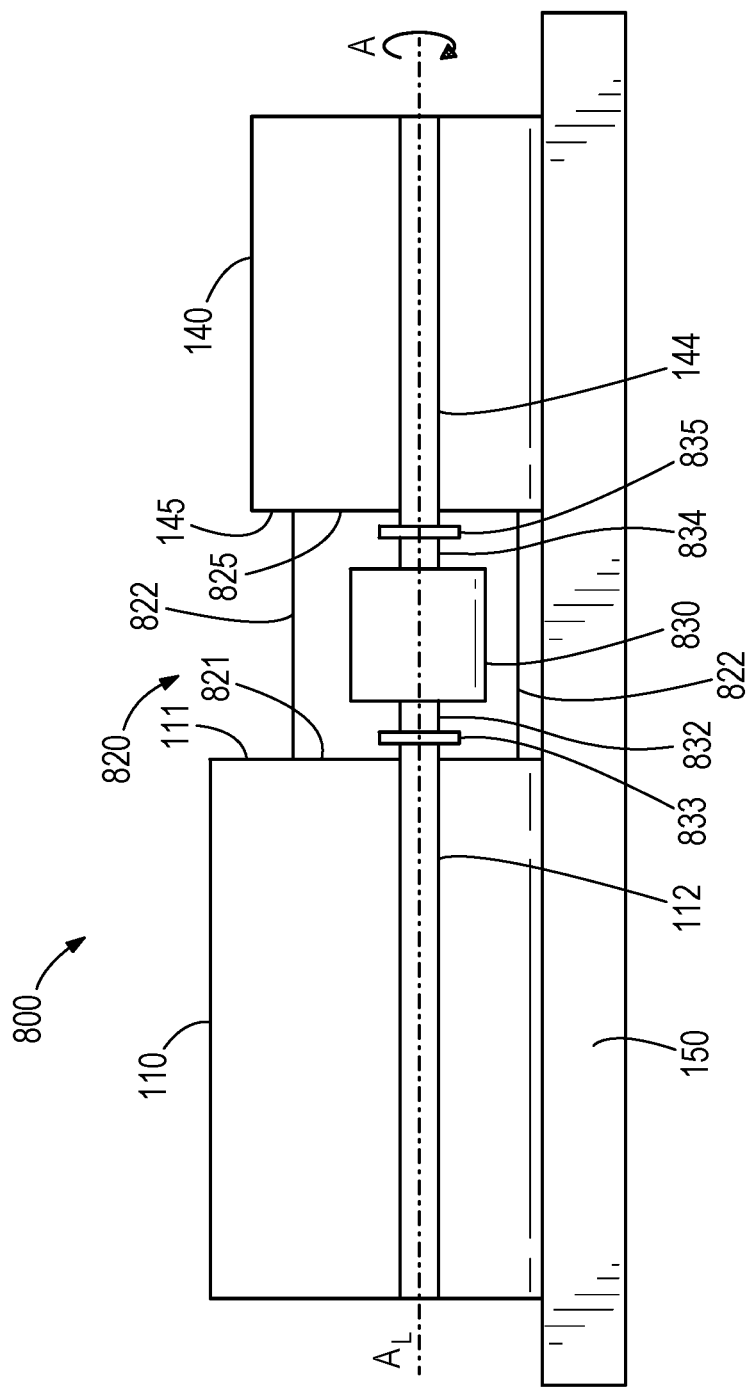
FIG. 15 is a schematic illustration of a generator set including an engine, a generator, a chassis and a gearbox.

FIG. 15 shows a schematic illustration of a generator set 800 according to an embodiment. The generator set 800 may include a large generator set, for example having a power rating of greater than 500 kW. The generator set 100 includes the engine 110 including the crankshaft 112, a gearbox 820, the generator 140 including the generator shaft 144, and the skid frame or chassis 150. The gearbox 820 is positioned between the engine 110 and the generator 140 and operatively couples the crankshaft 112 to the generator shaft 144, thereby allowing mechanical energy to be transmitted from the crankshaft 112 to the generator shaft 144 for producing electrical energy. The crankshaft 112 and the generator shaft 144 are axially aligned along a longitudinal axis $A_L$ of the generator set 100 via the gearbox 820. In some embodiments, the crankshaft 112 and the generator shaft 114 may be vertically aligned.

The gearbox 820 includes a gearbox housing 822 and a gear set 830 positioned within an internal volume defined by the gearbox housing 822. The gear set 830 includes a first gear shaft 832 coupled to a crankshaft first end of the crankshaft 112 via a first coupling 833 (e.g., the first coupling 133), and a second gear shaft 834 coupled to a generator shaft first end of the generator shaft 144 via a second coupling 835 (e.g., the second coupling 135). The gear set 830 may include simple 2 gears, sun gears, planetary gears, epicyclic gears or any other suitable gear assembly.

The gearbox housing 822 includes a first end 821 coupled to an engine first end 111 of the engine 110. Furthermore, the gearbox housing 822 includes a second end 825 coupled to a generator first end 145 of the generator 140. The structural coupling of the engine 810, the gearbox housing 822 and the generator 140 provides enhanced mechanical stiffness and strength to the genset 800. Because of the structural coupling, the engine 110, the gearbox housing 822 and the generator 140 may form an integrated torque bearing structure or a "torque tube" for transmission of torque load between the coupled elements of the engine 110, the gearbox 820, and the generator 140.

The engine 110 and the generator 140 are positioned on and rigidly coupled to the skid frame or chassis 150, while the gearbox housing 822 is rigidly coupled to the engine first end 111 and the generator first end 145 as described herein. The rigid coupling of the gearbox housing 822 to the engine 110 and the generator 140 which are rigidly coupled to the chassis 150 and to each other further adds to the structural strength of the torque tube structure formed thereby.

Expanding further, the engine 110 and the generator 140 may have significant mass. Generally, a gearbox is positioned on the chassis 150 but not structurally coupled to the engine 110 and the generator 140 such that the chassis 150 is the only structural member that couples the engine 110 and the generator 140. FIG. 15A shows a side cross-section of the chassis 150 having a neutral axis. The stiffness of a gearbox positioned on the chassis 150 between the engine 110 and the generator 140 but not coupled thereto, highly corresponds to an area moment of inertia of the chassis 150.

In contrast, the gearbox 820 and the other gearboxes described herein are rigidly coupled via stiff connectors (e.g., fasteners such as bolts, screws, nuts, rivets, etc.) to engine 110 and the generator 140. FIG. 15B shows the side cross-section of the generator set 800 with the gearbox 820 stiffly and rigidly coupled to the engine 110 and the generator 120. As shown in FIG. 15B, the structural coupling of the gearbox 820 (or any other gearbox described herein) shifts the neutral axis of the generator set 800 towards a more central location of the generator set 800 which greatly increases the stiffness of the generator set 800.

Figure 16:
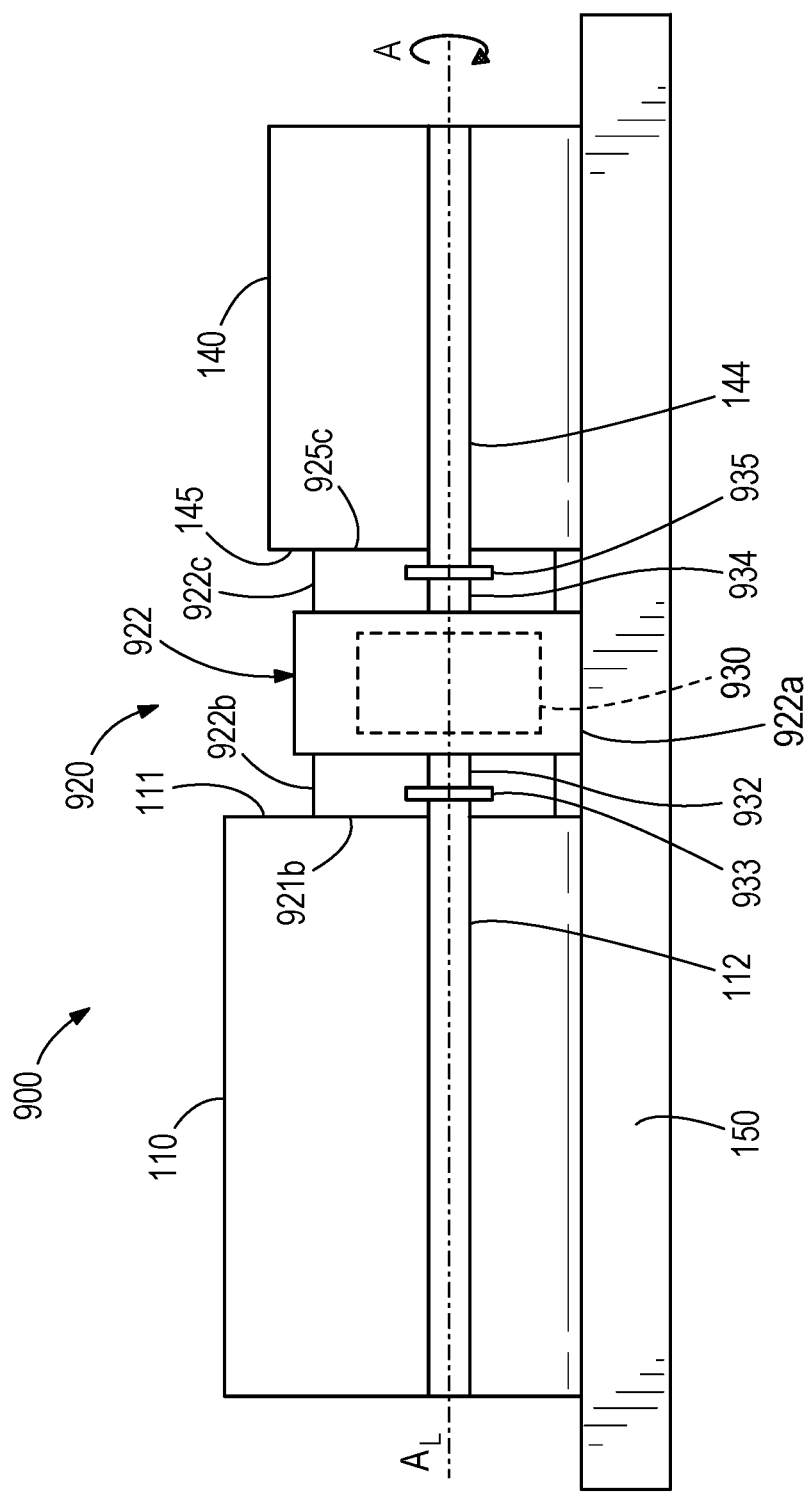
FIG. 16 is a schematic illustration of a generator set including an engine, a generator and a gearbox rigidly coupled to the engine, the generator and a skid frame.

FIG. 16 shows a schematic illustration of a generator set 900 according to an embodiment. The genset 900 may include a large genset, for example having a power rating of greater than 500 kW. The generator set 900 includes the engine 110 including the crankshaft 112, a gearbox 920, the generator 140 including the generator shaft 144, and the skid frame or chassis 150. The gearbox 920 is positioned between the engine 110 and the generator 140 and operatively couples crankshaft 112 to the generator shaft 144, thereby allowing mechanical energy to be transmitted from the crankshaft 112 to the generator shaft 144 for producing electrical energy. The crankshaft 112 and the generator shaft 144 are axially aligned along a longitudinal axis $A_L$ of the generator set 100 via the gearbox 920.

The gearbox 920 includes a gearbox housing 922 and a gear set 930 positioned within an internal volume defined by the gearbox housing 922. The gear set 930 includes a first gear shaft 932 coupled to a crankshaft first end of the crankshaft 112 via a first coupling 933 (e.g., the first coupling 133), and a second gear shaft 934 coupled to a generator shaft first end of the generator shaft 144 via a second coupling 935 (e.g., the second coupling 135). The gear set 930 may include simple 2 gears, sun gears, planetary gears, epicyclic gears or any other suitable gear assembly.

The gearbox housing 922 includes a housing first portion 922a positioned on and coupled to the chassis 150. The gearbox housing 822 also includes a housing second portion 922b having a second portion first end 921b coupled to the engine first end 111 of the engine 110 but not to the chassis 150. Furthermore, the gearbox housing 222 also includes a housing third portion 922c having a second portion first end 925c coupled to the generator first end 145 but not to the chassis 150.

The engine 110, the generator 140 and the housing first portion 922a are positioned on and rigidly coupled to the skid frame or chassis 150. Furthermore, the housing second portion 922b and the housing third portion 922c form stiff and rigid coupling with the engine 110 and the generator 140, respectively as described herein. In this manner, the rigid coupling of the gearbox housing 922 to the engine 110 and the generator 140 which are rigidly coupled to the chassis 150 and to each other further adds to the structural strength of the torque tube structure formed thereby. The gearbox 922 may allow for optimized design of the chassis 150 for reduced torque load so as to allow strength and material of the chassis 150 to be optimized and reduce cost.

Figure 17:
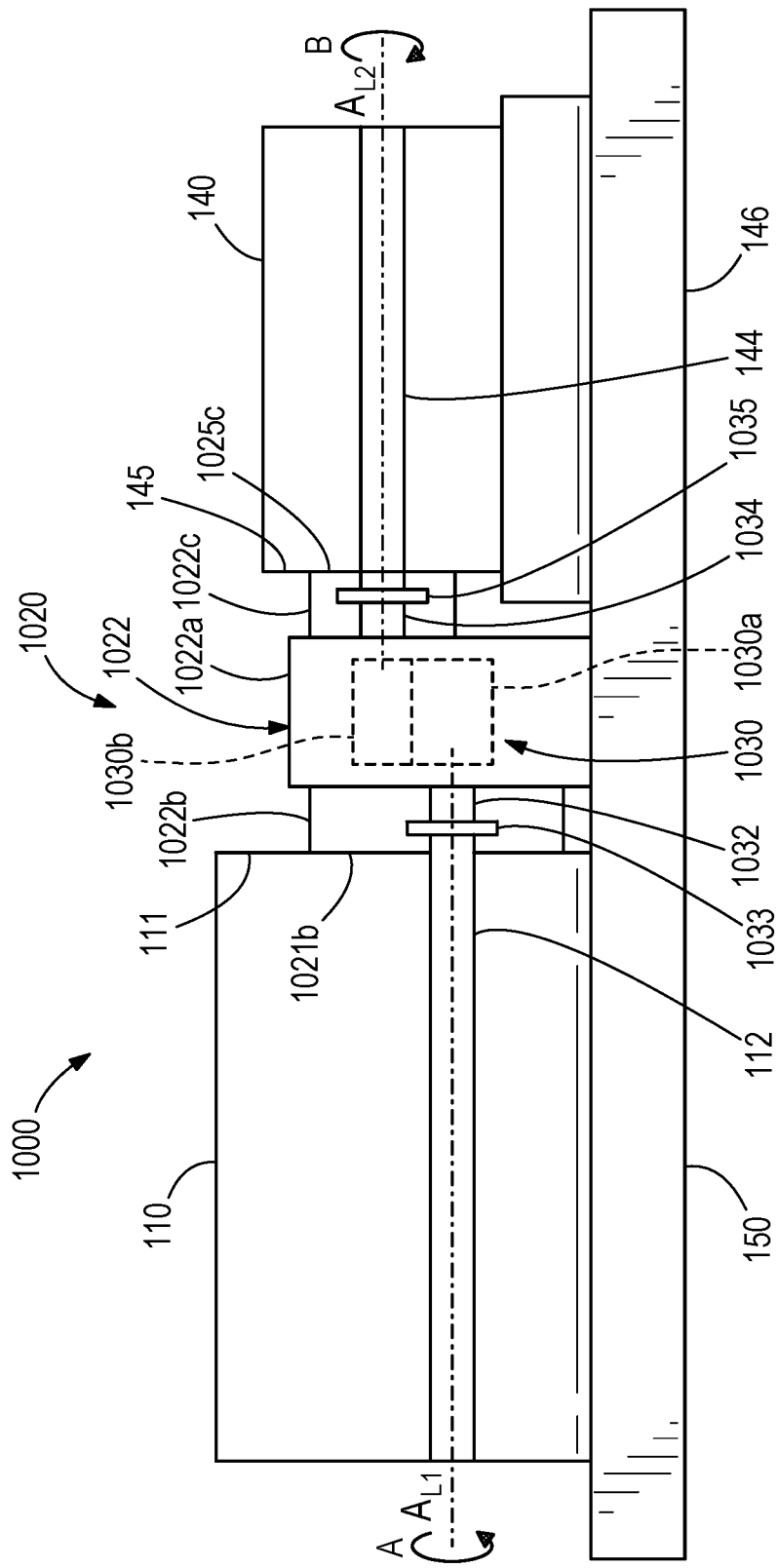
FIG. 17 is a schematic illustration of a generator set including an engine, generator and a gearbox operatively coupling a crankshaft of the engine to a generator shaft of the generator such that the crankshaft and the generator shaft are vertically offset.

FIG. 17 shows a schematic illustration of a generator set 1000 according to an embodiment. The genset 1000 may include a large generator set, for example having a power rating of greater than 500 kW. The generator set 1000 includes the engine 110 including the crankshaft 112, a gearbox 1020, the generator 140 including the generator shaft 144, and the skid frame or chassis 150. The gearbox 920 is positioned between the engine 110 and the generator 140 and operatively couples crankshaft 112 to the generator shaft 144, thereby allowing mechanical energy to be transmitted from the crankshaft 112 to the generator shaft 144 for producing electrical energy.

The crankshaft 112 is positioned along a first axial axis $A_{L1}$ and the generator shaft 144 is positioned along a second axial axis $A_{L2}$ which is axially offset from the from first axial axis $A_{L1}$. The gearbox 1020 includes a gearbox housing 1022 and a gear set 1030 positioned within an internal volume defined by the gearbox housing 1022. The gear set 1030 includes a first gear 1030a having a first gear shaft 1032 coupled to a crankshaft first end of the crankshaft 112 via a first coupling 1033 (e.g., the first coupling 133). The first gear shaft 1032 is axially aligned with the first axial axis Au of the crankshaft 112.

The gear set 1030 also includes a second gear 1030b having a second gear shaft 1034 coupled to a generator shaft first end of the generator shaft 144 via a second coupling 1035 (e.g., the second coupling 135). The second gear shaft 1034 is axially aligned with the second axial axis $A_{L2}$ of the crankshaft 112, such that the crankshaft 112 and the generator shaft 144 are operatively coupled to each other while being axially offset from each other. The gear set 1030 may include simple 2 gears, sun gears, planetary gears, epicyclic gears or any other suitable gear assembly.

The gear set 1030 may be configured to convert a rotational motion of the crankshaft 112 along a first rotational direction about the first axial axis Au as shown by the arrow A (e.g., a counter clock-wise rotation) to a rotational motion of the generator shaft 144 about a second rotational direction opposite the first rotational direction as shown by the arrow B (e.g., a clockwise direction). In some embodiments, the gear set 1030 may be configured such that the first rotational direction and the second rotational direction are in the same rotational direction (e.g., clockwise or counter clockwise direction).

The gearbox housing 1022 includes a housing first portion 1022a positioned on and coupled to the chassis 150. The gearbox housing 1022 also includes a housing second portion 1022b having a second portion first end 1021b coupled to the engine first end 111 of the engine 110 but not to the chassis 150. Furthermore, the gearbox housing 1022 also includes a housing third portion 1022c having a second portion first end 1025c coupled to the generator first end 145 but not to the chassis 150.

The engine 110 and the housing first portion 1022a are positioned on and rigidly coupled to the skid frame or chassis 150. While FIG. 17 shows the generator 140 detached from the chassis 150, in some embodiments, the generator 140 may also be coupled to the chassis 150. For example, a generator frame 146 may be positioned on and rigidly coupled to the chassis 150. The generator 140 may be positioned on the generator frame 146 (e.g., a raised platform) and rigidly coupled thereto so as to rigidly couple the generator 140 to the chassis 150. Furthermore, the housing second portion 1022b and the housing third portion 1022c form stiff and rigid coupling with the engine 110 and the generator 140, respectively as described herein. The gearbox 1022 may allow for optimized design of the chassis 150 for reduced torque load so as to allow strength and material of the chassis 150 to be optimized and reduce cost.

Figure 18:
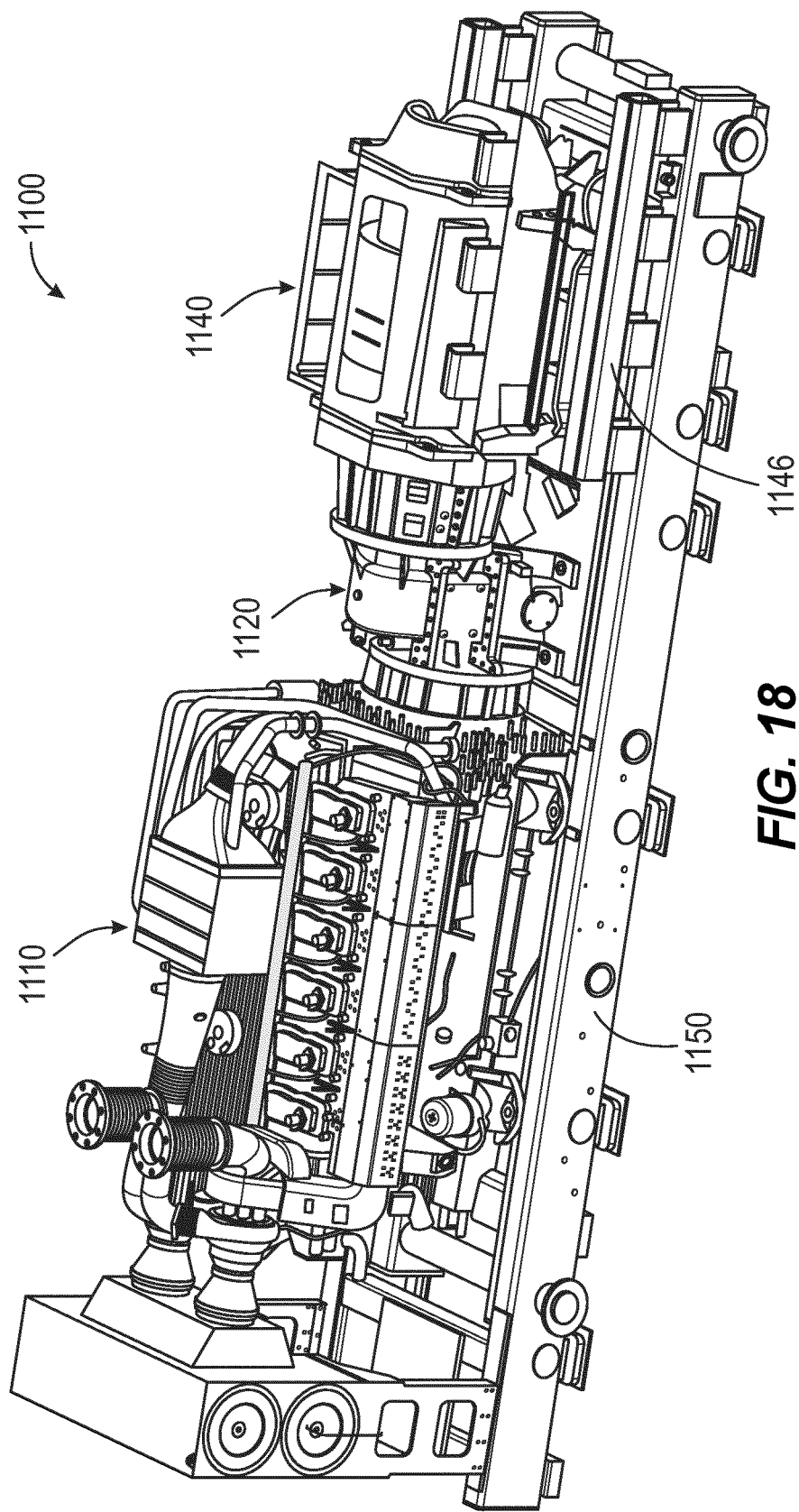
FIG. 18 is a perspective view of a generator set including an engine, a generator vertically offset from the engine, and a gearbox operatively coupling a crankshaft of the engine to a generator shaft of the generator.

FIG. 18 is an isometric view of a genset 1100, for example having a power rating of greater than 500 kW. The generator set 1100 includes an engine 1110 including a crankshaft (not shown), a gearbox 1010, a generator 1140 including a generator shaft (not shown), and a skid frame or chassis 1150. The engine 1110 and the generator 1140 may be substantially similar to the engine 110/210, and the generator 140/240, respectively or any other engine or generator described herein. The skid frame 1150 may be substantially similar to the skid frame 650 shown in FIGS. 12 and 13, or any other skid frame described herein.

The gearbox 1120 is positioned between the engine 1110 and the generator 1140 and operatively couples the crankshaft to the generator shaft, thereby allowing mechanical energy to be transmitted from the crankshaft to the generator shaft for producing electrical energy. The engine 1110 and the gear box 1120 are positioned on and rigidly coupled to the skid frame or chassis 1150. The generator 1140 is positioned on the generator frame 1146 (e.g., a raised platform) and rigidly coupled thereto so as to rigidly couple the generator 1140 to the skid frame 1150. Furthermore, a housing of the gearbox 1120 is rigidly coupled to each of the engine 1110 and the generator 1140. The gearbox 1120 may allow for optimized design of the chassis 1150 for reduced torque load so as to allow strength and material of the chassis 1150 to be optimized and reduce cost.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:
1. A generator set, comprising:
an engine including a crankshaft rotatable in a first direction about a longitudinal axis of the generator set, and an engine housing;

a generator including a generator shaft and a generator housing;

a gearbox positioned between the engine and the generator and coupling the crankshaft to the generator shaft, the gear box including:

a gearbox housing having a first flange rigidly coupling the gearbox housing directly to the engine housing, and a second flange rigidly coupling the gearbox housing directly to the generator housing, and a gear set including a plurality of gears, a first gear shaft coupled to a crankshaft first end of the crankshaft, and a second gear shaft coupled to a generator shaft first end of the generator shaft; and a skid frame, each of the engine, the gearbox and the generator positioned on and rigidly coupled to the skid frame, wherein the crankshaft, at least a portion of the plurality of gears, and the generator shaft are axially aligned along the longitudinal axis of the generator set, and wherein the gearbox interfaces with the engine and the generator to form a rigid torque tube structure.

2. The generator set of claim 1, wherein the gearbox causes the generator shaft to also rotate in the first direction.

3. The generator set of claim 1, wherein the gearbox causes the generator shaft to rotate in a second direction opposite the first direction.

4. The generator set of claim 1, wherein the gearbox causes each of the engine, the gearbox and the generator to react in the same direction in response to a torque generated by the crankshaft.

5. The generator set of claim 1, wherein the first gear shaft and the crankshaft first end are coupled together via a flex plate.

6. The generator set of claim 5, further comprising:
a flywheel coupled to the crankshaft first end, the flywheel coupled to the flex plate.

7. The generator set of claim 6, wherein the flywheel is positioned within an internal volume defined by the gearbox housing.

8. The generator set of claim 1, wherein the second gear shaft and the generator shaft are coupled together via at least one of a rubber coupling or a viscous coupling.

9. The generator set of claim 1, wherein the gear set comprises:
a first pair of gears operably coupled to the crankshaft and the generator shaft via the first gear shaft and the second gear shaft, the first pair of gears axially aligned along the longitudinal axis of the generator set.

10. The generator set of claim 9, wherein the gear set further comprises:
a second pair of gears operably coupled to the first pair of gears, the second pair of gears axially offset from the longitudinal axis of the generator set.

11. The generator set of claim 1, wherein the generator, the gear box and the engine mounted on the skid frame are structured to be securely positioned within an enclosure.

12. A gearbox for coupling a crankshaft of an engine to a generator shaft of a generator, comprising:
a gearbox housing having a first end and a second end, the first end structured to directly couple to an engine first end of the engine and the second end structured to directly couple to a generator first end of the generator, the gear box housing defining a continuous body connecting the first end and the second end, and structured to be positioned on and rigidly coupled to a skid frame; and a gear set including a plurality of gears, a first gear shaft and a second gear shaft, the first gear shaft structured to couple to a crank shaft first end of the crankshaft, and a second gear shaft structured to couple to a generator shaft first end of the generator shaft such that the crankshaft, at least a portion of the plurality of gears, and the generator shaft are axially aligned when the gearbox is coupled to the engine and generator.

13. The gearbox of claim 12, wherein the gearbox is structured to allow rotation of the crankshaft and the generator shaft in the same direction.

14. The gearbox of claim 12, wherein coupling of the gearbox housing to the engine and the generator causes the engine, the gearbox and the generator to form a torque tube structure, the torque tube structure reacting in the same direction in response to a torque generated by the crankshaft.

15. The gearbox of claim 12, further comprising:
a flex plate positioned on the first gear shaft, the flex plate structured to couple to a flywheel positioned on the crankshaft first end, wherein the gearbox housing defines an internal volume, the flywheel positionable within the internal volume.

16. The gear box of claim 12, wherein the gear set includes:
a first pair of gears structured to couple to the crankshaft and the generator shaft via the first gear shaft and the second gear shaft, the first pair of gears oriented to axially align with a longitudinal axis of each of the crankshaft and the generator shaft, and a second pair of gears operably coupled to the first pair of gears, the second pair of gears axially offset from the first pair of gears.

17. The gear box of claim 12, further comprising:
a first flange rigidly coupling the first end of the gearbox housing to the engine first end, and
a second flange rigidly coupling the second end of the gearbox housing to the generator first end.

18. A method of coupling a crankshaft of an engine to a generator shaft of a generator, comprising:
providing a gear box, the gearbox including a gearbox housing having a first end and a second end and a continuous body connecting the first end and the second end, and a gear set including a plurality of gears, a first gear shaft and a second gear shaft;

directly coupling the first end of the gearbox housing to an engine first end of the engine;

coupling the first gear shaft to a crankshaft first end of the crankshaft, at least a portion of the plurality of gears axially aligned with the crankshaft;

directly coupling the second end of the gearbox housing to a generator first end of the generator;

coupling the second gear shaft to a generator shaft; and
positioning each of the engine, the generator and the gearbox on a skid frame, the engine, the gearbox and the generator rigidly coupled to the skid frame, wherein the coupling of the first gear shaft to the crankshaft and the second gear shaft to the generator shaft causes the crankshaft, at least a portion of the plurality of gears and the crankshaft to be axially aligned so that the engine, the gearbox and the generator form a rigid torque tube structure.

19. The method of claim 18, wherein coupling of the first gear shaft to the crankshaft first end and the second gear shaft to the generator set first end allows the crankshaft and the generator shaft to rotate in the same direction.

20. The method of claim 18, wherein the coupling of the first end of the gearbox housing to the engine first end and the coupling of the second end of the gearbox housing to the generator first end causes each of the engine, the gearbox and the generator to react in the same direction in response to a torque generated by the crankshaft.

* * * * *